United States Patent [19]

Lum et al.

[11] Patent Number: 4,462,053
[45] Date of Patent: Jul. 24, 1984

[54] METHOD FOR CONTROLLING A DISC HEAD

[75] Inventors: Francis Lum, Ann Arbor; Bruce Graham, Ypsilanti; Samuel N. Irwin, Ann Arbor; Juan F. Velazquez, Saline, all of Mich.

[73] Assignee: Irwin International, Inc., Ann Arbor, Mich.

[21] Appl. No.: 280,137

[22] Filed: Jul. 2, 1981

[51] Int. Cl.³ .................. G11B 21/08; G11B 21/10
[52] U.S. Cl. ................................. 360/78; 360/77
[58] Field of Search .............. 360/78, 77, 135, 75, 360/69, 70, 71, 72, 97, 98, 95; 318/561, 571

[56] References Cited

U.S. PATENT DOCUMENTS

| | | | |
|---|---|---|---|
| 4,103,314 | 7/1978 | Case | 360/78 |
| 4,133,011 | 1/1979 | Kurzwell | 360/78 |
| 4,257,074 | 3/1981 | Goss | 360/78 |
| 4,272,793 | 6/1981 | Van Landingham | 360/78 |
| 4,297,737 | 10/1981 | Andresen | 360/135 |
| 4,331,987 | 5/1982 | Oda | 360/78 |
| 4,352,131 | 9/1982 | Van Herk | 360/77 |

Primary Examiner—Robert Martin Kilgore
Attorney, Agent, or Firm—Price, Heneveld, Huizenga & Cooper

[57] ABSTRACT

A method for positioning and maintaining a disc head over a desired track centerline on a disc rotatably carried on a disc drive. The distance between the current position of the disc head and the desired track centerline is monitored, and a signal generally proportional to that distance is applied to the disc head moving mechanism to cause the disc head to move toward the track centerline. The control signal is clipped if it exceeds predetermined maximum and minimum values.

20 Claims, 7 Drawing Figures

METHOD FOR CONTROLLING A DISC HEAD

BACKGROUND OF THE INVENTION

This invention relates to a method for positioning two objects relative one another, and more particularly for positioning and maintaining a disc head over a desired track on a disc recording surface.

Disc drives are frequently used as secondary storage for computing systems. A typical disc drive includes a rotating spindle having one or more recording surfaces fixedly mounted thereon for rotation therewith. Data is written onto the disc in concentric circles denominated tracks by a head positioned closely adjacent the recording surface. This recorded information may subsequently be read from the disc using either this same head or a second head specially adapted for reading.

The recording head is typically fixedly mounted on an arm capable of moving radially with respect to the rotating surface. The individual tracks on the recording surface are accessed by positioning the head over the desired track by moving the disc arm radially. The repositioning of the head from one track to another is referred to as a seek. Frequently, these seeks limit the speed of the overall computing system because they are mechanical operations whereas the remainder of the computing system typically operates at electronic speeds. Therefore, it is extremely desirable to have the head move rapidly and accurately to the target track on each seek. However, there is a trade-off between the velocity of head movement and the accuracy of the landing position over the desired track. If the head is moved at a relatively high velocity, it acquires a certain momentum which if not properly arrested causes the head to overshoot or pass over the desired track rather than stopping on this desired track. When this happens, it is necessary to move the head in the reverse direction to correct this overshooting.

Consequently, methods for moving the disc arm and head vary greatly in their trade-off between speed and overshooting. Some algorithms favor extremely high head velocities claiming that the time required to fine tune the head over the desired track after the major portion of the movement is offset by the time saved moving the head at the high velocity. Other algorithms prefer to move the head more slowly so that no overshoot results when the desired track is reached. Proponents of these algorithms maintain that the time saved in settling the head over the track is better spent moving the head more slowly.

Embedded servo technology has greatly increased the track-packing densities previously available without such technology. With embedded servos, servoing information is placed on the disc enabling the head to very precisely follow the centerline of each data track. Typically, embedded servo bursts are sampled and a positional error signal is generated which is fed back to the disc-arm-moving mechanism to precisely position the head over the centerline of the track.

Typically, prior artisans have treated the seek function and the follow function as two separate functions. That is to say that one module of the disc drive unit is responsible for seeking a desired track and a second module is responsible for maintaining the head in proper alignment over that track. The inclusion of these two modules renders these drives relatively complex and consequently expensive.

SUMMARY OF THE INVENTION

The method of the present invention strikes an appropriate compromise between head velocity and landing-position accuracy. In the method of the present invention, the distance between the current head position and the desired track centerline is monitored to determine the remaining distance to be covered during the seek. A signal is then calculated which is generally proportional to this distance, and the signal is applied to the disc-arm-moving mechanism. This control signal is clipped at a maximum value when the distance exceeds this predetermined maximum value.

Consequently, the head travels at a fixed maximum velocity when it is more than a predetermined number of tracks away from the desired track centerline. When the head approaches the track centerline, the velocity of the head is generally proportional to the remaining distance between the head and the desired track centerline. Accordingly, the velocity of the head is reduced as the head approaches the desired track so that there is little, if any, overshoot at the desired track.

The method of the present invention treats the seek function and following function as a single function using a single control method. Consequently, only one module is required to both seek the desired track and then maintain the head over that track. Accordingly, movement of the disc head is greatly simplified, both conceptually and in reality.

These and other objects, advantages, and features of the invention will be more fully understood and appreciated by reference to the written specification and appended drawings.

DESCRIPTION OF THE PREFERRED EMBODIMENT

Figure 1:
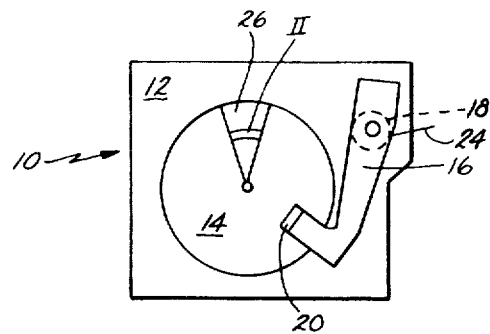
FIG. 1 is a top plan view of a disc drive utilizing the method of the present invention.

A disc drive unit is shown in FIG. 1 and generally designated 10. Disc drive 10 generally comprises frame 12, disc 14 rotatably mounted thereon, and disc arm 16. Disc arm 16 is pivotally mounted on frame 12 and actuated by disc arm motor 18. Head 20 is secured to the terminal end of disc arm 16 and is positioned closely adjacent the recording surface of disc 14. Consequently, pivotal movement of arm 16 on frame 12 results in radial movement of head 20 with respect to disc 14. Read/write wires 22 are electronically connected to head 20 to carry signals to and from the head as necessary. Control wires 24 are connected to motor 18 to actuate the motor as necessary. Disc drive 10 as thus far described is well known to one skilled in the art and, accordingly, a more detailed explanation is unnecessary. The disc drive incorporating the method of the present invention is more fully described in copending application Ser. No. 280,262, filed July 2, 1981, entitled HEAD ARM AND CONTROL SYSTEM THEREFOR, and assigned to the assignee of the present application.

Figure 2:
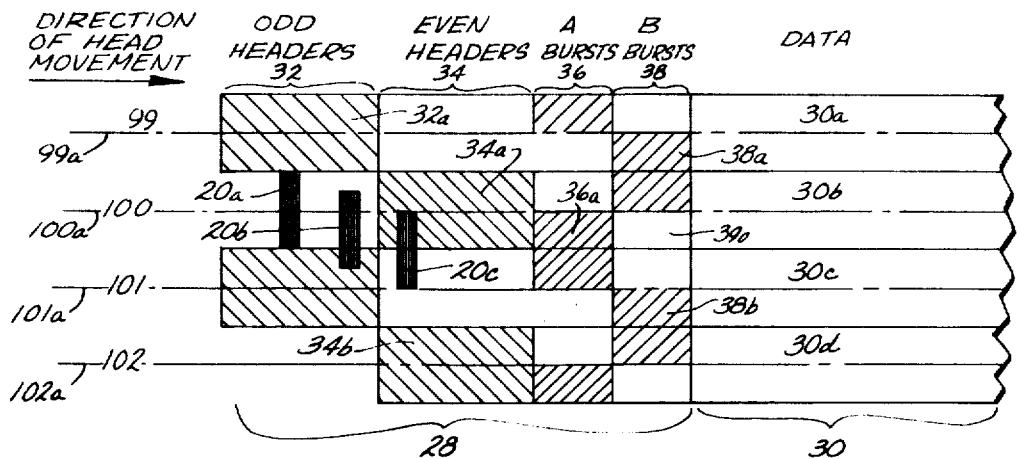
FIG. 2 is an exploded view of the area denominated II in FIG. 1.

The recording surface of disc 14 is divided into a number of pie-shaped pieces, or segments, 26. A portion of segment 26, denominated II in FIG. 1, is shown exploded in FIG. 2. The recording surface of disc 14 is divided into a plurality of concentric tracks, for example 99, 100, 101, and 102. As most clearly shown in FIG. 2, header information 28 is positioned on each track at the beginning of each segment 26. This header information 28 is then followed by a much longer data field 30 containing the information actually written onto and read from the disc during computing system processing. Centerlines 99a, 100a, 101a and 102a are imaginary lines drawn through the exact center of each data field 30 in tracks 99, 100, 101, and 102 respectively.

Embedded servo information 28 generally comprises (in the order in which they pass under head 20 when disc 14 is rotating) odd headers 32, even headers 34, A bursts 36, and B bursts 38. Odd headers 32 are positioned precisely about centerlines of odd tracks such as 99a and 101a of tracks 99 and 101, respectively. Likewise, even headers 34 are positioned precisely about the centerlines of all even tracks. Either one odd header 32 or one even header 34 is provided for each track in each sector on disc 14. Odd headers 32 are offset from even headers 34 along the length of the track with the trailing edge of each odd header 32 being generally aligned with the leading edge of its adjacent even headers 34.

A bursts 36 and B bursts 38 are positioned precisely between track centerlines. Accordingly, each one of bursts 36 and 38 abuts its adjacent track centerlines without, however, crossing either centerline. For example, A burst 36a is precisely between centerlines 100a and 101a, while B burst 38a is precisely between centerlines 99a and 100a. A bursts 36 and B bursts 38 are offset along the lengths of the tracks. That is to say, that all B bursts 38 follow A bursts 36. Further, it can be seen that A and B bursts 36 and 38 follow odd and even headers 32 and 34 and precede the data fields 30. Bursts 36 and 38 are signals of fixed frequency and fixed length. Servo information 28 and its utilization in a servo-positioning system, such as disc drive 10, is more fully described in copending application Ser. No. 280,138, filed July 2, 1981, entitled DATA RECORD WITH PRERECORDED TRANSDUCER POSITIONING SIGNALS, AND SYSTEM FOR UTILIZING SAME, and assigned to the assignee of the present application. Although the invention therein is described with particular reference to a tape record and drive, it is also applicable to a disc drive, as is appreciated by one having ordinary skill in the art.

For the remainder of this application, it will be assumed that track 100 is the desired or target track. Accordingly, if the head is described in a position other than dead center aligned on centerline 100a, it is assumed that corrections are required to move the head into alignment with centerline 100a. However, of course, the description is equally applicable to other tracks at the desired or target track.

Head 20a shows the head position when the head is properly aligned on track 100. When so positioned, head 20a will not read either of adjacent odd headers 32a or 32b as the disc surface rotates under the head. However, even header 34a will pass directly under head 20a and be read thereby. Continuing along centerline 100a, the head will pass over one-half of A burst 36a and one-half of B burst 38a. Accordingly, the controller knows that head 20 is aligned with centerline 100a when the amplitude of the signal read at A burst 36a is equal to the amplitude of the signal read at B burst 38b.

Head 20b shows the position of head 20 over disc 14 when head 20b is out of line with centerline 100a by one-quarter track. When in this position, head 20b will pass over odd header 32b but will receive an inadequate signal to indicate that an odd header has been read. However, head 20b will pick up a full signal from even header 34a, informing the control circuitry that an even header has been encountered. As disc surface 14 continues to rotate past head 20b, a signal of higher amplitude will be received when head 20b passes over A burst 36a than when head 20b passes over B burst 38a. The controller then knows that head 20b is offset from the centerline of 100a and takes corrective action as will be described.

Head 20c shows the position of the head when in an ambiguous position, i.e. neither aligned with track 100 nor 101. When in this position, head 20c will receive signals from both odd header 32b and even header 34a indicating that the head may be aligned with either track 100 or 101. Further, whereas head 20c will receive a signal from A burst 36a, no signal will be received from a B burst because head 20c is aligned with void 39 between adjacent B bursts 38a and b. When in this condition, the read/write circuitry must be disabled because head 20 is not positioned over any track. Indeed, if head 20 is misaligned by more than one-quarter of a half-track width, neither reading nor writing should take place as this may result in erroneous information being written or read.

Briefly summarizing, as head 20 traverses embedded servo information 28, both an odd header 32 and an even header 34 are read if possible, i.e. if a signal is detected. Further, the amplitudes of the signals received at bursts 36 and 38 are sampled and compared. From this information, the current position of head 20 can be determined at least with an accuracy of one-half track width. If head 20 is within one-quarter track width of a centerline, the control circuit knows which track the head is positioned over. If the head is more than one-quarter track width away, an ambiguous situation is encountered. If the amplitude of the signal received from the A burst is identical to the amplitude of the signal received from the B burst, head 20 is positioned precisely over the centerline. However, if the signal amplitude from one of bursts 36 and 38 is stronger than the signal amplitude from the other of bursts 36 and 38, the control circuitry knows that the head is not aligned with a centerline and indeed can determine how far off from a centerline the head is to an accuracy of at least one-half track width. If the sample of the A and B bursts 36 and 38 indicates that the head is misaligned by more than one-quarter track width, the control system cannot make a determination of which of the two tracks head 20 is more precisely aligned with.

Figure 3:
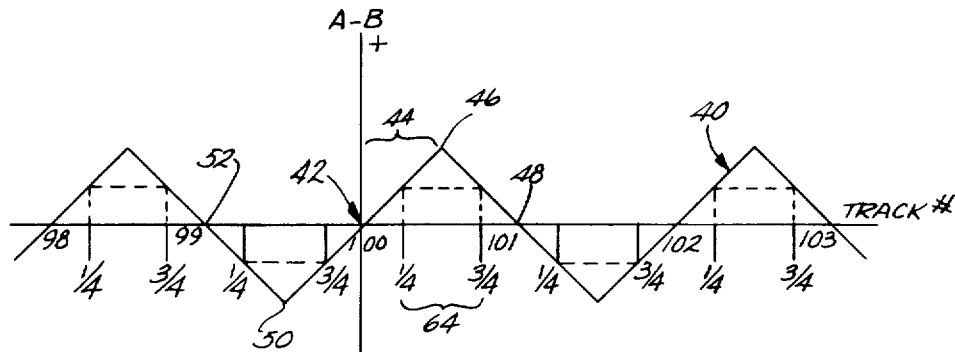
FIG. 3 is a plot of the embedded servo error signal generated by the method of the present invention.

A graphic example of the relation between the magnitude of the signals received at the A and B bursts 36 and 38 is shown in FIG. 3. This figure shows the track number plotted along the horizontal axis and the value A minus B along the vertical axis. The value of A minus B is plotted as line 40, which generally has a saw tooth pattern. When head 20 is precisely aligned over centerline 100a, the signal received from A burst 36a is exactly equal to the signal received from B burst 38a. Consequently, their difference is zero as indicated at point 42 where line 40 crosses both the horizontal and vertical axes. However, as head 20 strays towards track 101, the signal amplitude received from A burst 36a will be larger than the signal amplitude received from B burst 38a, and accordingly A minus B will be a positive number as shown along the portion 44. When head 20 is offset equally between said lines 100a and 101a as shown at 20c, the signal amplitude received from A burst 36a will be at its maximum with no signal received from B burst 38a so that the value A minus B will assume its maximum as shown at point 46. As head 20 strays further towards track 101 the quantity A minus B will become smaller as the head begins to pass over B burst 38b and less of A burst 36a. When head 20 is precisely aligned with track 101a, the signal received at A burst 36a will be identical to the signal received at B burst 38b and the quantity A minus B will again be zero as indicated at point 48.

Likewise, as head 20 strays toward track 99, the quantity A minus B will assume an increasingly negative value until head 20 is positioned precisely between tracks 99 and 100. At this point, the quantity A minus B will assume its maximum negative value indicated at 50. When head 20 is positioned precisely over track 99, the signals received at the A and B bursts will again be equal, and the quantity A minus B will be zero as indicated at 52. The remainder of line 40 extends to track zero in the left direction and to the maximum track number in the right direction maintaining its repetitious, saw tooth pattern. Line 40 crosses the horizontal axis precisely at each track centerline as the A and B bursts 36 and 38 will be equal to one another at these points. When going from an even number track to the next higher odd number track, the value A minus B will always be a positive number. Likewise, when going from an odd number track to the next higher even number track, the quantity A minus B will always assume a negative value.

Figure 5:
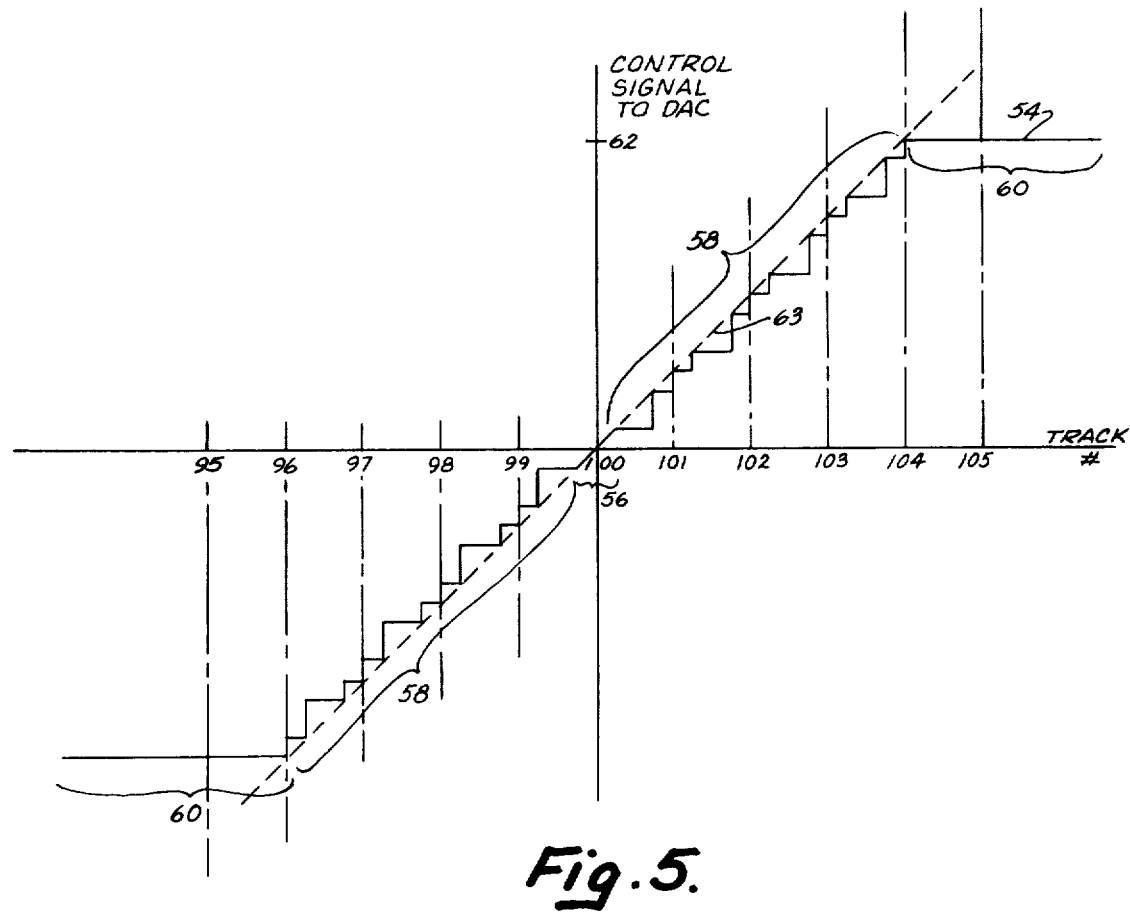
FIG. 5 is a plot of the control signal generated by the method of the present invention.

The function 54 for converting the distance between the current head position and the desired track centerline into the control signal sent to the digital-to-analog converter (DAC) 86 to control disc arm motor 18 is shown in FIG. 5. Track number is plotted along the horizontal axis while the magnitude of the signal sent to DAC 86 is plotted along the vertical axis. Briefly summarizing, function 54 (1) is linear at 56 when the head position is within one-quarter of a track width from desired track centerline 100a, (2) has a stairstep quality 58 on either side of the linear portion which extends to the maximum and minimum control signals, and (3) has a fixed minimum and maximum value 60 when the distance is greater or less than four tracks, respectively. Maximum signal value 62 is selected based upon the other components in the system.

Figure 6:
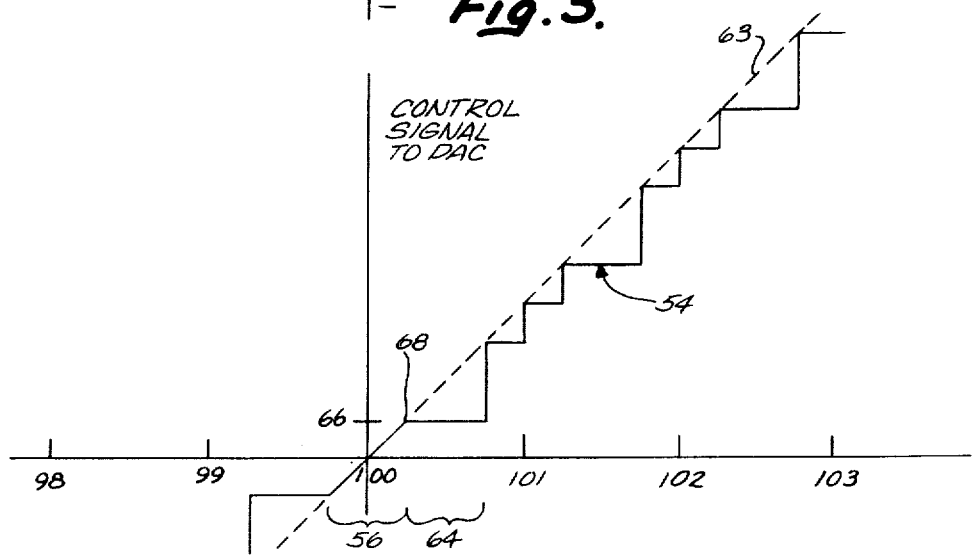
FIG. 6 is an exploded view of a portion of the plot shown in FIG. 5.

A portion of the plot shown in FIG. 5 is exploded in FIG. 6 so that the horizontal axis has precisely the same scale as the plot in FIG. 3. Function 54 is generally linear in area 56, which is within one-quarter track width of centerline 100a. That is to say that if the current head position is within one-quarter track width of centerline 100a, the signal sent to disc arm motor 18 through DAC 86 is generally proportional to the distance between the track centerline and the current head position. If the current head position is on the low side of the track centerline, the sign of the signal must be a negative value to move the head toward centerline 100a.

Ideally, function 54 would be linear as shown by dotted line 63 along its entire distance within four tracks of the desired track (i.e. from track 96 to track 104). However, this is not possible because the position of head 20 cannot always be precisely determined. When head 20 is more than one-quarter track width from the centerlines of both adjacent tracks as shown at 20c, head 20 will detect both an odd header 32b and an even header 34a. This situation arises whenever head 20 is in the area 64 denominated on FIG. 3 (i.e. more than one-quarter track width from both adjacent tracks). After passing the odd and even header, head 20 will then pass over both a portion of an A burst 36 and a portion of a B burst 38. However, this burst information does not resolve the ambiguity because head 20 does not know whether it is passing over a portion of B burst 38a or B burst 38b. Accordingly, whenever head 20 is at one of the positions within area 64, the control circuitry cannot determine precisely where within that area the head lies. All that is known is that the head is more than one quarter track width from both adjacent centerlines 100a and 101a.

Because the control circuitry does not know exactly where head 20 is when it is within area 64, it must output control signal value 66, which is the minimum value of ideal function 63 within area 64. This step is equivalent to computing the minimum possible distance between disc head 20 and the desired track centerline and outputting the value of function 54 for that minimum distance. If function 54 assumed a higher value in area 64, and if head 20 is only one-quarter track width from centerline 100a (i.e. point 68), the value of function 54 would be too high, giving head 20, and disc arm 16 associated therewith, too much momentum. The remainder of function 54 encountered before head 20 reached centerline 100 (i.e. area 56) would be inadequate to slow down disc arm 16 to prevent overshoot. Accordingly, to be safe rather than sorry, function 54 assumes the minimum 66 of the possible ideal values in area 64.

For similar reasons, function 54 is stairstepped at the other points indicated along portions 58 of function 54. When the current position of head 20 is a fixed distance (four tracks in the preferred embodiment) or further from the desired centerline 100a, function 54 is given a maximum value of 62 as indicated by portions 60. Of course, the sign of the signal issued to disc arm motor 18 through DAC 86 is dependent upon which side of the desired centerline head 20 is on. If head 20 is on the low side of centerline 100a, the signal is negative, while if head 20 is on the high side of centerline 100a, the signal is positive.

Figure 4:
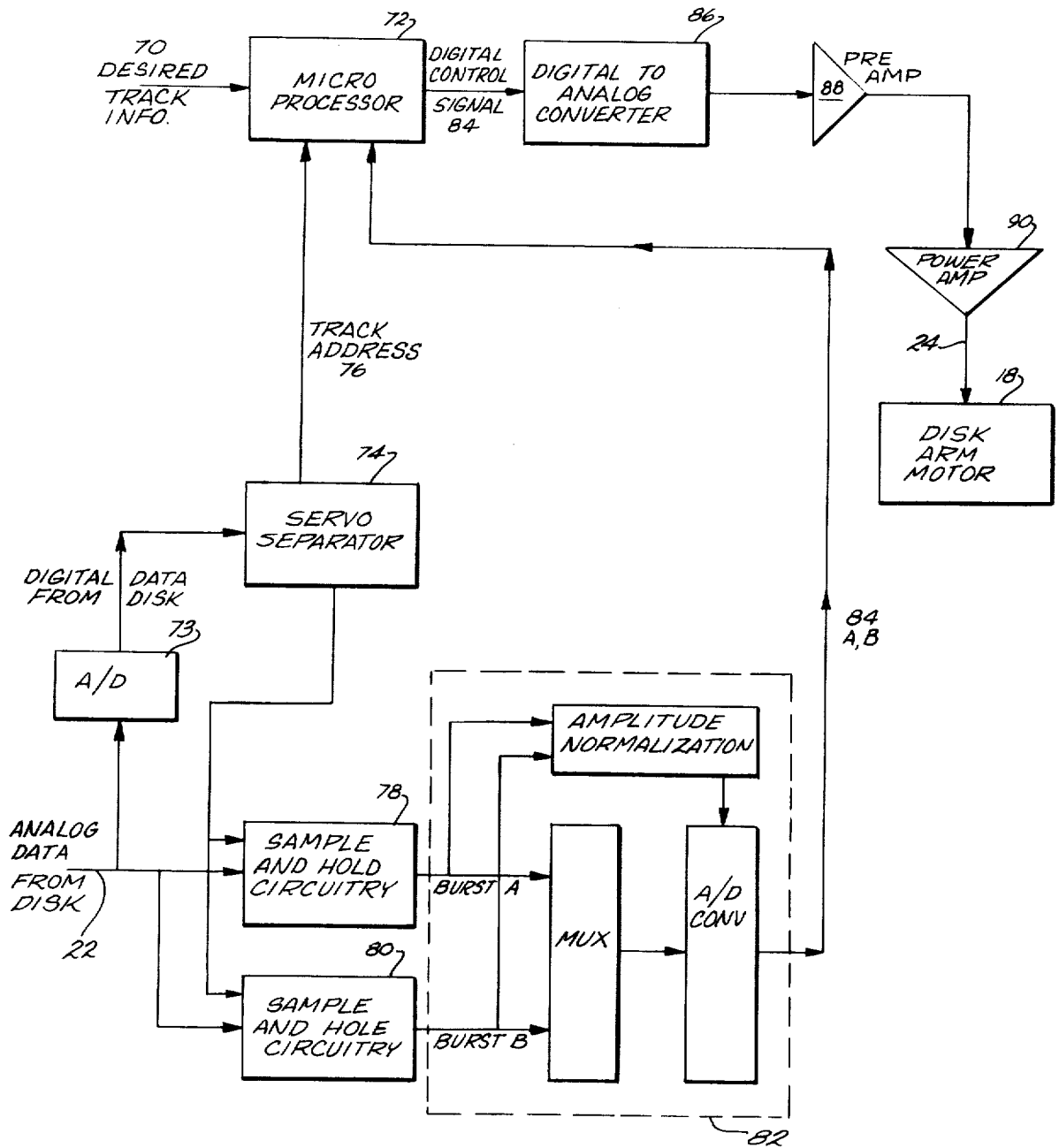
FIG. 4 is a schematic diagram showing the control components implementing the method of the present invention.

The hardware for implementing the control method of the present invention is shown in FIG. 4. As in FIG. 1, disc arm motor 18 is electrically connected to control wire 24, while head 20 is electrically connected to read/write wires 22. The analog data from the disc constantly passes through A-to-D converter 73 and servo separator 74. The current track address 76 is obtained from servo separator 74 and bussed to microprocessor 72.

The analog data from the disc is also fed through wires 22 to both of sample and hold circuits 78 and 80. A signal from servo separator 74 controls the operation of circuits 78 and 80 so that the burst A signal and burst B signal are emitted from circuits 78 and 80 respectively at the appropriate times. Analog bursts A and B pass through circuitry 82 so that the analog signals are normalized and digitized before being bussed to microprocessor 72. The details of circuit 82 are fully and completely described in copending application Ser. No. 280,127, filed July 2, 1981, entitled METHOD AND APPARATUS FOR NORMALIZING SERVO-POSITIONING SIGNALS, assigned to the same assignee of this application.

To initiate a seek, the desired track address 70 is fed into the disc arm microprocessor 72. Disk arm microprocessor 72 calculates a digital control signal to be sent to DAC 86 based on the value of desired track address 70, current track address 76, and digitized A and B 84. The digital control signal 85 output by microprocessor 72 corresponds to function 54 shown in FIG. 5. The computed signal is then bussed serially to DAC 86 and pre-amp 88, which drives power amp 90 and disc arm motor 18.

Figure 7:
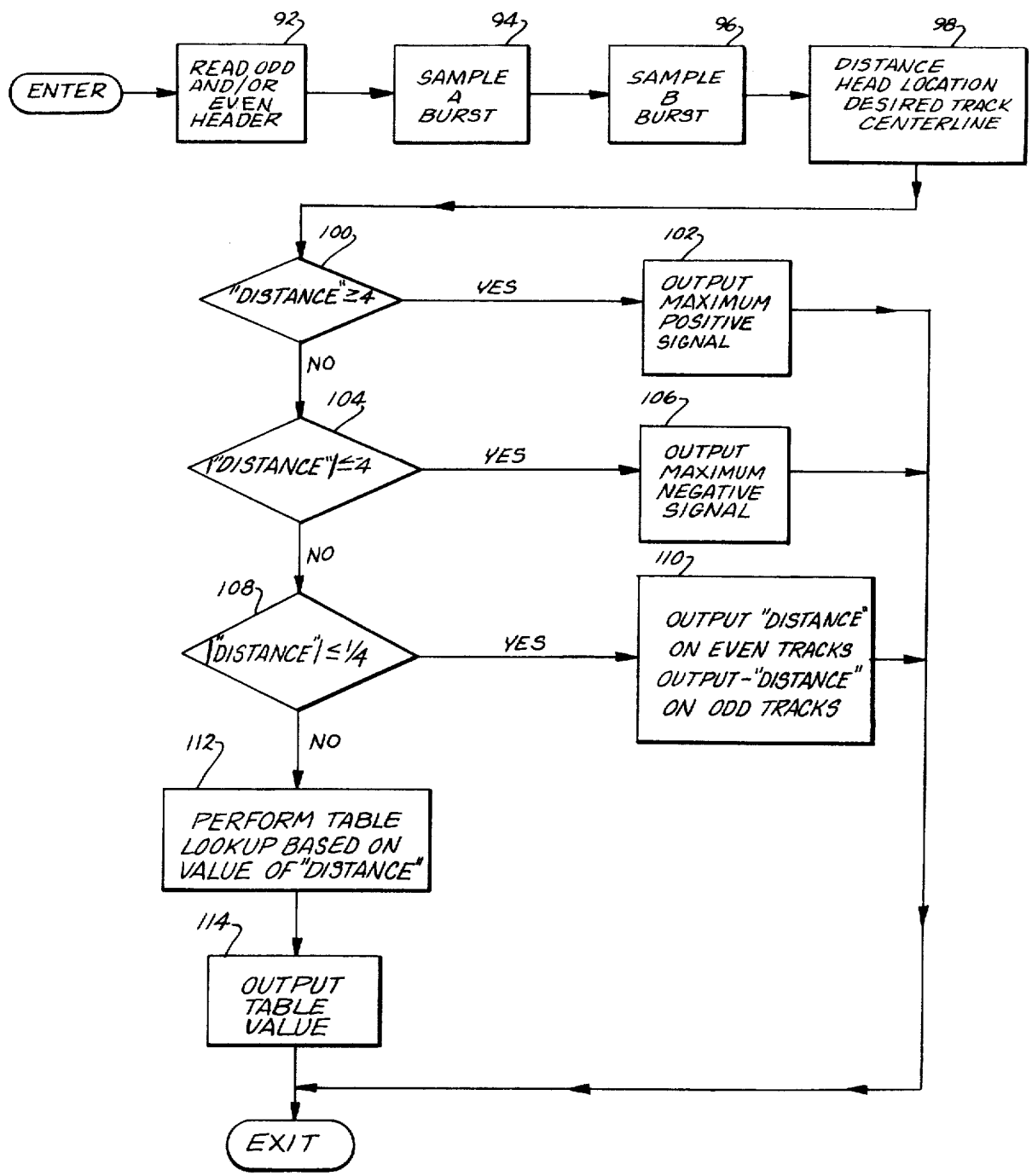
FIG. 7 is a flow chart detailing the processing flow of the microprocessor shown in FIG. 4.

A flow chart showing the processing flow of microprocessor 72 is illustrated in FIG. 7. Each time that a sector header is read, the microprocessor 72 commences execution of the flow chart shown in FIG. 7. As indicated in boxes 92, 94, and 96, odd and/or even headers are read, as well as the amplitudes of the signals generated by the A and B bursts. Flow then passes to box 98 where the distance between the desired track centerline and the current head position is calculated. As previously described, this calculation is accurate to at least one-half track width. At boxes 100 and 104, the distance is tested to determine if it is greater than or equal to four tracks (100), or less than or equal to minus four tracks (102). If either test is satisfied, the maximum positive signal or maximum negative signal respectively (102 and 106) is output and execution terminates for that sector. At box 108, the absolute value of the distance is compared with one-quarter track width. If the distance is less than one-quarter track, that distance is output on even tracks and minus distance is output on odd tracks (box 110). If none of the tests of boxes 100, 104, or 108 are satisfied, the program performs a table look-up based on the distance to obtain the value of function 54 for that distance. As indicated in box 114, this value is then output and execution terminates.

A listing for a program implementing the flow chart shown in FIG. 7 is attached to this application as Appendeix A. This program is written in the 8041 assembly language, but is not intended to restrict the scope of this application to that particular language. With access to the flow chart of FIG. 7 and/or the computer program attached hereto as Appendix A, one having ordinary skill in the art could readily implement the flow chart of FIG. 7 in any appropriate computer language.

The method of the present invention performs both the seek function and the follow function required of a hightrack-density disc. Consequently, the hardware required to implement the present invention as well as the software can be far less complex than in prior units because only one module is required for all head functions. Although the present application has treated track 100 as the desired or target track, it is readily understood that the method of the present invention is equally applicable to any target track by merely moving function 54 horizontally so that linear portion 56 aligns with the appropriate desired track centerline. Typically, the target track number will change frequently during operation of disc drive 10.

The method of the present invention provides a desirable balance between the disc arm speed and landing accuracy when seeking a desired track. It provides a signal which is generally proportional to the distance from the desired track centerline. However, when this distance cannot be computed with absolute precision, the signal issued to the disc arm moving mechanism is the minimum of the ideal linear values in the area of uncertainty. Consequently, the disc arm control method of the present invention provides a process whereby the disc head may be rapidly moved to a desired location with a not undesirable degree of overshoot when arriving at the desired location.

Of course, it is understood that the above is merely a preferred embodiment of the invention and that various changes and alterations can be made without departing from the spirit and broader aspects of the invention as set forth in the appended claims, which are to be interpreted in accordance with the principles of patent law including the doctrine of equivalents.

APPENDIX A

```
LOC  OBJ           LINE        SOURCE STATEMENT

1  $       MOD41 MACROFILE
                    2  $       TITLE ('510 DISK POSITIONER; 1504002-A; 6/23/81')
                    3  ;
                    4  ;       IRWIN 510
                    5  ;       DISK SERVO POSITIONER
                    6  ;       23 JUNE 1981
                    7  ;
                    8  ;       REFERENCE INFORMATION
                    9  ;          1508002   REV A.  -  PROGRAMMED EPROM, 510 DISK POSITIONER
                   10  ;          1504002   REV A.  -  PROGRAM LISTING, 510 DISK POSITIONER
                   11  ;          1511001   REV A.  -  DISKETTE, 510 FIRMWARE
                   12  ;                    REV A.  -  FIRMWARE SPECIFICATION, 510 DISK POSITIONER
                   13  ;
                   14  ;
                   15  ;       (C) COPYRIGHT IRWIN INTERNATIONAL 1981
                   16  ;       ALL RIGHTS RESERVED
                   17  ;       THIS PROGRAM MAY NOT BE COPIED IN ANY FORM WITHOUT THE EXPRESS WRITTEN
                   18  ;       PERMISSION OF IRWIN INTERNATIONAL
                   19  ;
                   20  ;       THIS FIRMWARE ASSUMES THAT WHEN IN POSITION MODE A POSITIVE VALUE
                   21  ;       ON THE DAC DRIVES THE ARM TOWARD THE SPINDLE.
                   22  ;       A NEGATIVE VALUE DRIVES THE ARM TOWARD THE RIM
                   23  ;
                   24  ;                                                        ****************
                   25  ;       THIS FIRMWARE ASSUMES THAT ITS OUTPUT IS TO A ***  10 BIT DAC
                   26  ;                                                        ****************
                   27  ;
                   28  ;       THIS FRIMWARE HAS THE POSITION MODE FOR +4 TO -4 TRACKS
                   29  ;       AND THE VELOCITY RAMP SEEK MODE
                   30  ;       A MAXIMUM OF 2 VELOCITY RAMPS ARE EXECUTED THEN WE GO TO POSITION MODE
                   31  ;       THE VELOCITY RAMP(S) ARE OPEN LOOP AND WHEN COMPLETE A TRANSFER TO
                   32  ;       POSITION MODE IS MADE
                   33  ;
                   34  ;
                   35  ;
                   36  MOVE    MACRO   ARG1,ARG2
                   37  $       SAVE NOGEN
                   38          DB      90H                    ; MOV STS,A
                   39  $       RESTORE
                   40          ENDM
                   41  $       EJECT
```

```
42 ;
43 ;      REGISTER BANK 0 - DISK SERVO POSITIONER
44 ;
0000    45  DP      EQU     R0              ; DATA POINTER - NOT TRASHED BY INTERRUPTS
0001    46  MP      EQU     R1              ; MEMORY POINTER USED BY TCNTR INTERRUPT ROUT
0002    47  TM      EQU     R2              ; GENERAL TEMPORARY REGISTER
0003    48  SA0     EQU     R3              ; SAVED ACCUMULATOR IN BANK 0
0004    49  RH      EQU     R4              ; RESULT HIGH -- DOUBLE PRECISION ACCUMULATOR
0005    50  RLL     EQU     R5              ; RESULT LOW  -- DOUBLE PRECISION ACCUMULATOR
0006    51  AH      EQU     R6              ; ARGUMENT HIGH -- OPERAND FOR DOUBLE PRECISION
0007    52  AL      EQU     R7              ; ARGUMENT LOW  -- OPERAND FOR DOUBLE PRECISION
        53 ;
        54 ;      REGISTER BANK 1 - DISK COMMUNICATIONS
        55 ;
0000    56  CP      EQU     R0              ; COMMAND POINTER
0001    57  WP      EQU     R1              ; WORK POINTER
0002    58  BC      EQU     R2              ; BYTE COUNT
0007    59  SA1     EQU     R7              ; SAVED ACCUMULATOR ON INTERRUPT
        60 ;
        61 ;      EQUATES
00FF    62  ALL1S   EQU     11111111B       ; ALL ONES
00F7    63  IOSTB   EQU     11110111B       ; IOSTB* = 0    - IO STROBE
00FB    64  VCM     EQU     11111011B       ; VCM*   = 0    - D/A CONVERTER
007F    65  TRKEN   EQU     01111111B       ; TRKEN* = 0    - TRACK ADDR ENABLE
00BF    66  ADC     EQU     10111111B       ; ADC*   = 0    - A/D CONVERTER
00EF    67  DUMP    EQU     11101111B       ; DUMP*  = 0    - DUMP CAPACITORS
0020    68  RUN     EQU     00100000B       ; RUN* FROM MASTER SPINDLE PROCESSOR
00F3    69  WRVCM   EQU     VCM AND IOSTB
00B7    70  RDADC   EQU     ADC
00BF    71  WRADC   EQU     ADC AND IOSTB
        72 ;
        73 ;      PORT 4 FUNCTIONS
000E    74  VELG    EQU     1110B           ; VELOCITY GAIN
000D    75  SKFLG   EQU     1101B           ; SEEK FLAG - LOW WHILE SEEK IS IN PROGRESS
0007    76  INTDS   EQU     0111B           ; INTEGRATOR DISABLE
000F    77  POSG    EQU     1111B           ; POSITION GAIN
        78 ;
        79 ;      PORT 5 FUNCTIONS
000E    80  DBEN0   EQU     1110B           ; DBEN*  = 0    - DISK BUS ENABLE
0009    81  DBEN1   EQU     1001B           ; DBEN*  = 1    - DISK BUS DISABLE
        82 ;
        83 ;      PORT 6 FUNCTIONS
        84 ;      LOW TWO BITS ON TEN BIT DAC
```

```
LOC    OBJ           LINE            SOURCE STATEMENT

89 ;
                      90 ;           PORT 7 FUNCTIONS
 000C                 91 MUXAD0      EQU     1100B           ; MUX ADDRESS 0 B - SERVO BURST
 000F                 92 MUXAD3      EQU     1111B           ; MUX ADDRESS 3 A - SERVO BURST
                      93 $           EJECT
                      94 ;
                      95 ;
                      96 ;
 0080                 97 STPEND      EQU     080H            ; STATUS PENDING
 0080                 98 CPE         EQU     080H            ; COMMAND PARAMETER ERROR
 0020                 99 OT          EQU     020H            ; OFF TRACK ERROR
 0010                100 SE          EQU     010H            ; SEEK ERROR
 0008                101 SP          EQU     008H            ; SEEK IN PROGRESS
                     102 ;
                     103 ;           RAM LOCATION EQUATES
                     104 ;           DISK SERVO POSITIONER
                     105 ;
 0020                106 CMDLIST     EQU     32              ; COMMAND AND PARAMETERS
 002E                107 RMCNT       EQU     46              ; RAMP - COUNTER
 002F                108 TMD         EQU     47              ; BANG BANG TIME DELAY
 0030                109 DIR         EQU     48              ; BANG BANG DIRECTION
 0033                110 DSTAT       EQU     51              ; DISK STATUS
 0034                111 DSTS        EQU     52              ; COPY OF STS REGISTER
 0035                112 SKINP       EQU     53              ; SEEK IN PROGRESS
 0036                113 BMA         EQU     54              ; BURST B MINUS BURST A
 0038                114 HCNT        EQU     56              ; COUNT THE # OF HEADERS IN TRACK FOLLOWING
 0039                115 HH          EQU     57              ; HIGH VALUE OF CURRENT HEADER
 003A                116 HL          EQU     58              ; LOW VALUE OF CURRENT HEADER
 003B                117 DH          EQU     59              ; DESTINATION HIGH
 003C                118 DL          EQU     60              ; DESTINATION LOW
 003D                119 HEADER      EQU     61              ; HEADER FLAG
 003E                120 LOWCYL      EQU     62              ; LOWER CYLINDER ADDRESS
 003F                121 UPRCYL      EQU     63              ; UPPER CYLINDER ADDRESS
                     122 ;
                     123 ;           GENERAL CONSTANTS
                     124 ;
 FD9C                125 MAXTR       EQU     -612            ; MAXIMUM TRACK NUMBER
 0020                126 CYLOFF      EQU     32              ; USER TRACK 0
                     127 ;
                     128 ;           DEFINE A LANDING AREA ON THE INNER PORTION OF THE DISK
                     129 ;
 02CF                130 LANDTR      EQU     75+(CYLOFF-MAXTR)
                     131 $           EJECT
```

```
LOC   OBJ      LINE        SOURCE STATEMENT 0000                132              ORG     000H
                    133     ;
                    134     ; ENTER AT LOCATION 0 FOR:
                    135     ;     RESET
                    136     ;     POWER ON
                    137     ;
0000  C5            138              SEL     RB0
0001  64EC          139              JMP     RESET
                    140     ;
                    141     ; ENTER AT LOCATION 3 FOR:
                    142     ;     COMMAND WRITE FROM MASTER        F1 = 1
                    143     ;     DATA WRITE FROM MASTER           F1 = 0
                    144     ;
0003  D5            145              SEL     RB1                  ; COMMAND INTERRUPT USES RB1
0004  AF            146              MOV     SA1,A                ; SAVE ACCUMULATOR
0005  4400          147              JMP     CMDINT               ; PROCESS COMMAND INTERRUPT
                    148     $ EJECT
                    149     ;
                    150     ; ENTER AT LOCATION 7 FOR:
                    151     ;     EVENT COUNTER OVERFLOW ( ONCE PER SECTOR WHILE TRACK FOLLOWING )
                    152     ;
                    153     ; REGISTERS USED DURING INTERRUPT:
                    154     ;
                    155     ;      A
                    156     ;      X
                    157     ;
                    158     ;      RB0:    R0   R1   R2   R3   R4   R5   R6   R7
                    159     ;              MP   TM   SA   RH   RLL  AH   AL
                    160     ;              X    X    X    X    X    X    X
                    161     ;
                    162     ;
                    163     ;
0007  C5            164     TRK:     SEL     RB0
0008  AB            165              MOV     SA0,A
0009  160B          166              JTF     $+2                  ; CLEAR TIMER FLAG
                    167     ;****************************************************************
                    168     ;
                    169     ; PROCESS A/B BURST FOR TRACK FOLLOWING
                    170     ;
                    171     ;   NORMAL ALGORITHM IS SERVO BURST #2 MINUS SERVO BURST #1
                    172     ;   REVERSE ALGORITHM IS SERVO BURST #1 MINUS SERVO BURST #2
                    173     ;
                    174     ; IN REFERING TO SERVO BURSTS THE FOLLOWING TERMS ARE SYNONOMOUS
                    175     ;      A BURST = SERVO BURST 1
                    176     ;      B BURST = SERVO BURST 2
                    177     ;****************************************************************
```

| LOC | OBJ | LINE | SOURCE STATEMENT | | | |
|---|---|---|---|---|---|---|
| | | 178 | ; | | | |
| 000B | 230F | 179 | TRK1: | MOV | A,#MUXAD3 | ; SET MUX ADDR TO READ A - BURST |
| 000D | 3F | 180 | | MOVD | P7,A | |
| | | 181 | ; | | | |
| | | 182 | ; READ SERVO BURST 1 | | | |
| | | 183 | ; | | | |
| 000E | 8AFF | 184 | | ORL | P2,#ALL1S | ; TRISTATE DISK LOCAL BUS |
| 0010 | 99BF | 185 | | ANL | P1,#ADC | ; START CONVERSION BY WRITING A/D CONVERTER |
| 0012 | 8940 | 186 | | ORL | P1,#NOT ADC | ; THEN REMOVE THE CHIP SELECT |
| | | 187 | ; | | | |
| | | 188 | ; OVERLAP OTHER OPERATIONS WITH A/D CONVERSION | | | |
| | | 189 | ; | | | |
| 0014 | 09 | 190 | | IN | A,P1 | |
| 0015 | 5303 | 191 | | ANL | A,#11B | ; TWO LSBS ARE TRK9 AND TRK8 |
| 0017 | AC | 192 | | MOV | RH,A | ; MOVE TRACK ADDRESS HIGHT TO REGISTER |
| 0018 | B939 | 193 | | MOV | MP,#HH | |
| 001A | A1 | 194 | | MOV | @MP,A | |
| | | 195 | ; | | | |
| | | 196 | ; A/D MUST BE DONE BY NOW SO CHECK IT AND READ IT | | | |
| | | 197 | ; | | | |
| 001B | 261B | 198 | WNB1: | JNT0 | WNB1 | ; WAIT FOR NOT BUSY FROM A/D CONVERTER |
| 001D | 99B7 | 199 | | ANL | P1,#RDADC | ; READ VALUE FROM A/D CONVERTER |
| 001F | 0A | 200 | | IN | A,P2 | |
| 0020 | 8948 | 201 | | ORL | P1,#NOT RDADC | |
| 0022 | AF | 202 | | MOV | AL,A | ; SAVE SERVO BURST 1 IN REGISTER |
| | | 203 | ; | | | |
| | | 204 | ; READ SERVO BURST 2 | | | |
| | | 205 | ; | | | |
| 0023 | 230C | 206 | | MOV | A,#MUXAD0 | ; SET MUX ADDRESS TO READ BURST B |
| 0025 | 3F | 207 | | MOVD | P7,A | |
| 0026 | 3E | 208 | | MOVD | P6,A | ; ANTICIPATE LOW ORDER DAC BITS=0 |
| 0027 | 8AFF | 209 | | ORL | P2,#ALL1S | |
| 0029 | 99BF | 210 | | ANL | P1,#ADC | ; START CONVERSION BY WRITING A/D CONVERTER |
| 002B | 8940 | 211 | | ORL | P1,#NOT ADC | ; THEN REMOVE THE CHIP SELECT |
| | | 212 | ; | | | |
| | | 213 | ; OVERLAP OTHER OPERATIONS WITH A/D CONVERSION | | | |
| | | 214 | ; | | | |
| 002D | 997F | 215 | | ANL | P1,#TRKEN | ; ENABLE TRACK ADDRESS LOW ONTO THE BUS |
| 002F | 0A | 216 | | IN | A,P2 | |
| 0030 | 8980 | 217 | | ORL | P1,#NOT TRKEN | |
| 0032 | AD | 218 | | MOV | RLL,A | ; SAVE TRACK ADDRESS LOW IN REGISTER |
| 0033 | 19 | 219 | | INC | MP | |
| 0034 | A1 | 220 | | MOV | @MP,A | |
| | | 221 | ; | | | |
| | | 222 | ; A/D MUST BE DONE BY NOW SO CHECK IT AND READ IT | | | |

| LOC | OBJ | LINE | | SOURCE STATEMENT | | |
|---|---|---|---|---|---|---|
| | | 223 | ; | | | |
| 0035 | 2635 | 224 | WNB2: | JNT0 | WNB2 | ; WAIT FOR A/D CONVERTER NOT BUSY |
| 0037 | 99B7 | 225 | | ANL | P1,#RDADC | ; READ VALUE FROM A/D CONVERTER |
| 0039 | 0A | 226 | | IN | A,P2 | |
| 003A | 8948 | 227 | | ORL | P1,#NOT RDADC | |
| 003C | AE | 228 | | MOV | AH,A | ; SAVE SERVO BURST 2 IN REGISTER |
| | | 229 | ; | | | |
| | | 230 | ; IF HEADER FLAG IS ZERO THEN RETURN WITHOUT EFFECTING THE DAC OUTPUT | | | |
| | | 231 | ; | | | |
| 003D | B93D | 232 | | MOV | MP,#HEADER | |
| 003F | F1 | 233 | | MOV | A,@MP | |
| 0040 | C6DE | 234 | | JZ | TRK7 | |
| | | 235 | ; | | | |
| | | 236 | ; COMPUTE THE DIFFERENCE BETWEEN THE TWO SERVO BURSTS | | | |
| | | 237 | ; | | | |
| 0042 | FF | 238 | | MOV | A,AL | |
| 0043 | 37 | 239 | | CPL | A | ; NEGATE VALUE OF SERVO BURST 1 |
| 0044 | 17 | 240 | | INC | A | |
| 0045 | 6E | 241 | | ADD | A,AH | ; ADD SERVO BURST 2 |
| 0046 | B936 | 242 | | MOV | MP,#BMA | |
| 0048 | A1 | 243 | | MOV | @MP,A | |
| | | 244 | ; | | | |
| | | 245 | ; COMPUTE ZONE | | | |
| | | 246 | ; | | | |
| 0049 | F255 | 247 | Z0123: | JB7 | Z01 | |
| 004B | D251 | 248 | Z23: | JB6 | Z3 | |
| 004D | BA02 | 249 | Z2: | MOV | TM,#2 | |
| 004F | 045F | 250 | | JMP | TRK3 | |
| 0051 | BA03 | 251 | Z3: | MOV | TM,#3 | |
| 0053 | 045F | 252 | | JMP | TRK3 | |
| 0055 | D25B | 253 | Z01: | JB6 | Z1 | |
| 0057 | BA00 | 254 | Z0: | MOV | TM,#0 | |
| 0059 | 045F | 255 | | JMP | TRK3 | |
| 005B | BA01 | 256 | Z1: | MOV | TM,#1 | |
| 005D | 045F | 257 | | JMP | TRK3 | |
| | | 258 | ; | | | |
| | | 259 | ; EXCLUSIVE OR ZONE WITH 3 IF EVEN HEADER | | | |
| | | 260 | ; | | | |
| 005F | FD | 261 | TRK3: | MOV | A,RLL | |
| 0060 | 1266 | 262 | | JB0 | TRK4 | |
| 0062 | FA | 263 | | MOV | A,TM | |
| 0063 | D303 | 264 | | XRL | A,#003H | |
| 0065 | AA | 265 | | MOV | TM,A | |
| | | 266 | ; | | | |
| | | 267 | ; COMPUTE DELTA TRACKS | | | |

| LOC | OBJ | LINE | | SOURCE STATEMENT | | |
|---|---|---|---|---|---|---|
| | | 268 | ; | | | |
| 0066 | B93C | 269 | TRK4: | MOV | MP,#DL | |
| 0068 | FD | 270 | | MOV | A,RLL | |
| 0069 | 37 | 271 | | CPL | A | |
| 006A | 0305 | 272 | | ADD | A,#5 | |
| 006C | E66F | 273 | | JNC | TRK41 | |
| 006E | CC | 274 | | DEC | RH | |
| 006F | 61 | 275 | TRK41: | ADD | A,@MP | |
| 0070 | AD | 276 | | MOV | RLL,A | |
| 0071 | C9 | 277 | | DEC | MP | |
| 0072 | FC | 278 | | MOV | A,RH | |
| 0073 | 37 | 279 | | CPL | A | |
| 0074 | 71 | 280 | | ADDC | A,@MP | |
| 0075 | AC | 281 | | MOV | RH,A | |
| | | 282 | ; | | | |
| | | 283 | ; | VALID RESULTS ARE POSITIVE AND WITHIN THE RANGE 0 TO 8 | | |
| | | 284 | ; | | | |
| 0076 | F283 | 285 | | JB7 | MNEG | ; MAXIMUM NEGATIVE OUTPUT |
| 0078 | 967F | 286 | | JNZ | MPOS | |
| 007A | FD | 287 | | MOV | A,RLL | |
| 007B | 03F7 | 288 | | ADD | A,#-9 | |
| 007D | E687 | 289 | | JNC | TRK5 | |
| 007F | 23FF | 290 | MPOS: | MOV | A,#0FFH | ; 10-BIT DAC MAXIMUM POSITIVE |
| 0081 | 04D5 | 291 | | JMP | TRK6 | |
| 0083 | 2300 | 292 | MNEG: | MOV | A,#000H | ; 10-BIT DAC MAXIMUM NEGATIVE |
| 0085 | 04D5 | 293 | | JMP | TRK6 | |
| 0087 | FD | 294 | TRK5: | MOV | A,RLL | |
| 0088 | F7 | 295 | | RLC | A | |
| 0089 | F7 | 296 | | RLC | A | |
| 008A | 533C | 297 | | ANL | A,#03CH | |
| 008C | 6A | 298 | | ADD | A,TM | |
| 008D | E3 | 299 | | MOVP3 | A,@A | |
| 008E | D380 | 300 | | XRL | A,#080H | ; 10-BIT DAC FIXUP |
| 0090 | C6AB | 301 | | JZ | TRK50 | ; 10-BIT DAC FIXUP - ON DESTINATION TRACK |
| 0092 | D380 | 302 | | XRL | A,#080H | ; 10-BIT DAC FIXUP - RESTORE PREVIOUS VALUE |
| 0094 | AA | 303 | | MOV | TM,A | |
| 0095 | B935 | 304 | | MOV | MP,#SKINP | |
| 0097 | F1 | 305 | | MOV | A,@MP | |
| 0098 | 96A8 | 306 | | JNZ | TRK5A | ; SEE IF SEEK IS IN PROGRESS |
| 009A | B933 | 307 | | MOV | MP,#DSTAT | |
| 009C | F1 | 308 | | MOV | A,@MP | |
| 009D | 4320 | 309 | | ORL | A,#OT | |
| 009F | A1 | 310 | | MOV | @MP,A | |
| 00A0 | 02 | 311 | | OUT | DBB,A | |
| 00A1 | B934 | 312 | | MOV | MP,#DSTS | |
| 00A3 | F1 | 313 | | MOV | A,@MP | |

| LOC | OBJ | LINE | | SOURCE STATEMENT | | |
|---|---|---|---|---|---|---|
| 00A4 | 4380 | 314 | | ORL | A,#STPEND | |
| 00A6 | A1 | 315 | | MOV | @MP,A | |
| | | 316 | | MOVE | STS,A | |
| 00A8 | FA | 320 | TRK5A: | MOV | A,TM | |
| 00A9 | 04D5 | 321 | | JMP | TRK6 | ; 10-BIT DAC FIXUP |
| | | 322 | ; | | | |
| | | 323 | ; | USE B MINUS A | | |
| | | 324 | ; | | | |
| 00AB | 230F | 325 | TRK50: | MOV | A,#POSG | |
| 00AD | 3C | 326 | | MOVD | P4,A | |
| 00AE | B938 | 327 | | MOV | MP,#HCNT | |
| 00B0 | 11 | 328 | | INC | @MP | |
| 00B1 | F1 | 329 | | MOV | A,@MP | |
| 00B2 | 96BA | 330 | | JNZ | TRK50A | |
| 00B4 | B1FF | 331 | | MOV | @MP,#-1 | |
| 00B6 | B935 | 332 | | MOV | MP,#SKINP | |
| 00B8 | B100 | 333 | | MOV | @MP,#0 | |
| 00BA | B93C | 334 | TRK50A: | MOV | MP,#DL | |
| 00BC | F1 | 335 | | MOV | A,@MP | |
| 00BD | B936 | 336 | | MOV | MP,#BMA | |
| 00BF | 12C5 | 337 | | JB0 | TRK51 | |
| 00C1 | F1 | 338 | | MOV | A,@MP | |
| 00C2 | 37 | 339 | | CPL | A | |
| 00C3 | 17 | 340 | | INC | A | |
| 00C4 | A1 | 341 | | MOV | @MP,A | |
| 00C5 | F1 | 342 | TRK51: | MOV | A,@MP | |
| 00C6 | F7 | 343 | | RLC | A | |
| 00C7 | F1 | 344 | | MOV | A,@MP | |
| 00C8 | 67 | 345 | | RRC | A | |
| 00C9 | 3E | 346 | | MOVD | P6,A | |
| 00CA | F7 | 347 | | RLC | A | |
| 00CB | E7 | 348 | | RL | A | |
| 00CC | 53F0 | 349 | | ANL | A,#0F0H | |
| 00CE | E6D2 | 350 | | JNC | TRK52 | |
| 00D0 | 430F | 351 | | ORL | A,#00FH | |
| 00D2 | 47 | 352 | TRK52: | SWAP | A | ; 10-BIT DAC FIXUP |
| 00D3 | D380 | 353 | | XRL | A,#080H | ; 10-BIT DAC FIXUP |
| 00D5 | 3A | 354 | | OUTL | P2,A | |
| 00D6 | 99E3 | 355 | TRK6: | ANL | P1,#WRVCM AND DUMP | |
| 00D8 | 89FF | 356 | TRK61: | ORL | P1,#ALL1S | |
| 00DA | 8AFF | 357 | | ORL | P2,#ALL1S | |
| 00DC | B93D | 358 | | MOV | MP,#HEADER | |
| 00DE | B101 | 359 | TRK7: | MOV | @MP,#01 | |
| | | 360 | ; | | | |
| | | 361 | ; | RESET EVENT COUNTER | | |

| LOC | OBJ | LINE | | SOURCE STATEMENT | | |
|---|---|---|---|---|---|---|
| | | 362 | ; | | | |
| 00E0 | 25 | 363 | RCNTX: | EN | TCNTI | ; SET COUNTER FOR 1 EVENT |
| 00E1 | 23FF | 364 | | MOV | A,#ALL1S | |
| 00E3 | 62 | 365 | | MOV | T,A | |
| 00E4 | FB | 366 | | MOV | A,SA0 | ; RESTORE ACCUMULATOR |
| 00E5 | 93 | 367 | | RETR | | |
| | | 368 | $ | EJECT | | |
| | | 369 | ; | | | |
| | | 370 | ; | MISCELLANEOUS - SUBROUTINES | | |
| | | 371 | ; | | | |
| 00E6 | 16ED | 372 | ENTC: | JTF | ENTC1 | ; CALL TIMER INTERRUPT IF FLAG IS SET |
| 00E8 | 25 | 373 | | EN | TCNTI | |
| 00E9 | 23FF | 374 | | MOV | A,#ALL1S | |
| 00EB | 62 | 375 | | MOV | T,A | |
| 00EC | 83 | 376 | | RET | | |
| 00ED | 0407 | 377 | ENTC1: | JMP | TRK | |
| | | 378 | ; | | | |
| | | 379 | ; | WDAC - WRITE DAC OUTPUT | | |
| | | 380 | ; | | | |
| 00EF | 2380 | 381 | WDACO: | MOV | A,#080H | |
| 00F1 | 3E | 382 | | MOVD | P6,A | ; LOW ORDER DAC BITS TO 0 |
| 00F2 | 3A | 383 | WDAC: | OUTL | P2,A | |
| 00F3 | 99F3 | 384 | | ANL | P1,#WRVCM | |
| 00F5 | 890C | 385 | | ORL | P1,#NOT WRVCM | |
| 00F7 | 8AFF | 386 | | ORL | P2,#ALL1S | |
| 00F9 | 83 | 387 | | RET | | |
| | | 388 | $ | EJECT | | |
| 0100 | | 389 | | ORG | 100H | |
| | | 390 | ; | | | |
| | | 391 | ; | SEEK | | |
| | | 392 | ; | INTERRUPTS ARE ASSUMED TO BE DISABLED | | |
| | | 393 | ; | | | |
| 0100 | B92E | 394 | SEEK: | MOV | MP,#RMCNT | |
| 0102 | B1FE | 395 | | MOV | @MP,#-2 | |
| 0104 | B93A | 396 | | MOV | MP,#HL | ; LAST HEADER LOW |
| 0106 | 74BD | 397 | SEEK0: | CALL | DLDAN | ; LOAD A NEGATIVE |
| 0108 | B93C | 398 | | MOV | MP,#DL | |
| 010A | 74C9 | 399 | | CALL | DADD | ; RH;RLL GETS AH;AL + DM(MP-1);DM(MP) |
| 010C | 4D | 400 | | ORL | A,RLL | |
| 010D | 9613 | 401 | | JNZ | SEEK1 | ; TREAT ZERO LENGTH SEEK AS NO OPERATION |
| 010F | 14E6 | 402 | SEEKC: | CALL | ENTC | |
| 0111 | 44C4 | 403 | | JMP | CMDXIT | |
| | | 404 | ; | | | |
| | | 405 | ; | NON-ZERO LENGTH SEEK | | |
| | | 406 | ; | | | |

| LOC | OBJ | LINE | | SOURCE STATEMENT | |
|---|---|---|---|---|---|
| 0113 | B935 | 407 | SEEK1: | MOV | MP,#SKINP |
| 0115 | B101 | 408 | | MOV | @MP,#1 |
| 0117 | B938 | 409 | | MOV | MP,#HCNT |
| 0119 | B1FC | 410 | | MOV | @MP,#-4 |
| 011B | FC | 411 | | MOV | A,RH |
| 011C | F224 | 412 | | JB7 | SK1N |
| 011E | B930 | 413 | SK1P: | MOV | MP,#DIR |
| 0120 | B1FF | 414 | | MOV | @MP,#OFFH |
| 0122 | 2432 | 415 | | JMP | SEEK2 |
| 0124 | B930 | 416 | SK1N: | MOV | MP,#DIR |
| 0126 | B100 | 417 | | MOV | @MP,#000 |
| 0128 | FD | 418 | | MOV | A,RLL |
| 0129 | 37 | 419 | | CPL | A |
| 012A | 0301 | 420 | | ADD | A,#001 |
| 012C | AD | 421 | | MOV | RLL,A |
| 012D | FC | 422 | | MOV | A,RH |
| 012E | 37 | 423 | | CPL | A |
| 012F | 1300 | 424 | | ADDC | A,#000 |
| 0131 | AC | 425 | | MOV | RH,A |
| | | 426 | ; | | |
| | | 427 | ; | MANIPULATE DELTA TRACKS FOR SUBSEQUENT TABLE LOOKUPS | |
| | | 428 | ; | | |
| 0132 | FC | 429 | SEEK2: | MOV | A,RH |
| 0133 | 47 | 430 | | SWAP | A          ; USE MOST SIGNIFICANT 6 BITS |
| 0134 | 5330 | 431 | | ANL | A,#110000B ; MOVE TRK9;TRK8 TO B5;B4 |
| 0136 | AA | 432 | | MOV | TM,A       ; MASK THOSE BITS |
| 0137 | FD | 433 | | MOV | A,RLL |
| 0138 | 47 | 434 | | SWAP | A |
| 0139 | 530F | 435 | | ANL | A,#1111B   ; MOVE TRK7;TRK4 TO B3;B0 |
| 013B | 4A | 436 | | ORL | A,TM       ; MASK THOSE BITS |
| 013C | 0324 | 437 | | ADD | A,#LOW RTN2 ; RAMP TABLE FOR NON-ZERO HIGH ORDER BITS |
| 013E | E3 | 438 | | MOVP3 | A,@A |
| 013F | B92F | 439 | | MOV | MP,#TMD    ; RAMP TIME DELAY COUNTER |
| 0141 | A1 | 440 | | MOV | @MP,A |
| 0142 | 964D | 441 | | JNZ | SEEK3      ; BRANCH IF TABLE ENTRY IS NON-ZERO |
| | | 442 | ; | | |
| 0144 | FD | 443 | | MOV | A,RLL |
| 0145 | 0364 | 444 | | ADD | A,#LOW RTO ; RAMP TABLE FOR VALUES 0 TO 63 |
| 0147 | E3 | 445 | | MOVP3 | A,@A |
| 0148 | B92F | 446 | | MOV | MP,#TMD |
| 014A | A1 | 447 | | MOV | @MP,A |
| 014B | C69E | 448 | | JZ | SEEK5      ; BRANCH IF WITHIN 4 TRACKS TO TRACK FOLLOW |
| | | 449 | $ | EJECT | |

| LOC | OBJ | LINE | | SOURCE STATEMENT | | |
|---|---|---|---|---|---|---|
| | | 450 | ; | | | |
| | | 451 | ; | VELOCITY RAMP ALGORITHM | | |
| | | 452 | ; | | | |
| 014D | BC80 | 453 | SEEK3: | MOV | RH,#080H | ; INITIAL DAC VALUE |
| 014F | BD00 | 454 | | MOV | RLL,#000H | |
| 0151 | B930 | 455 | | MOV | MP,#DIR | |
| 0153 | F1 | 456 | | MOV | A,@MP | |
| 0154 | 965C | 457 | | JNZ | GPOS | ; CHECK DIRECTION OF SEEK |
| 0156 | BEFF | 458 | GONEG: | MOV | AH,#0FFH | |
| 0158 | BF80 | 459 | | MOV | AL,#080H | ; SET 10-BIT DAC INCREMENT TO -2 |
| 015A | 2460 | 460 | | JMP | IRMUP | |
| 015C | BE00 | 461 | GPOS: | MOV | AH,#000H | ; GO INITIALIZE THE RAMP UP |
| 015E | BF80 | 462 | | MOV | AL,#080H | ; SET 10-BIT DAC INCREMENT TO +2 |
| | | 463 | ; | | | |
| 0160 | B92F | 464 | IRMUP: | MOV | MP,#TMD | |
| 0162 | F1 | 465 | | MOV | A,@MP | |
| 0163 | AA | 466 | | MOV | TM,A | |
| 0164 | 2306 | 467 | | MOV | A,#INTDS AND VELG | |
| 0166 | 3C | 468 | | MOVD | P4,A | |
| 0167 | 246B | 469 | | JMP | RAMUP | |
| 0169 | 00 | 470 | DELUP: | NOP | | |
| 016A | 00 | 471 | | NOP | | |
| 016B | 54CE | 472 | RAMUP: | CALL | RTDAC | |
| 016D | 54D9 | 473 | | CALL | BUMP | |
| 016F | EA69 | 474 | | DJNZ | TM,DELUP | |
| | | 475 | ; | | | |
| 0171 | FF | 476 | | MOV | A,AL | |
| 0172 | 37 | 477 | | CPL | A | |
| 0173 | 0301 | 478 | | ADD | A,#001H | |
| 0175 | AF | 479 | | MOV | AL,A | |
| 0176 | FE | 480 | | MOV | A,AH | |
| 0177 | 37 | 481 | | CPL | A | |
| 0178 | 1300 | 482 | | ADDC | A,#000H | |
| 017A | AE | 483 | | MOV | AH,A | |
| 017B | B92F | 484 | | MOV | MP,#TMD | |
| 017D | F1 | 485 | | MOV | A,@MP | |
| 017E | AA | 486 | | MOV | TM,A | |
| 017F | 2483 | 487 | | JMP | RAMDN | |
| 0181 | 00 | 488 | DELDN: | NOP | | |
| 0182 | 00 | 489 | | NOP | | |
| 0183 | 54CE | 490 | RAMDN: | CALL | RTDAC | |
| 0185 | 54D9 | 491 | | CALL | BUMP | |
| 0187 | EA81 | 492 | | DJNZ | TM,DELDN | |
| 0189 | 2307 | 493 | | MOV | A,#INTDS | |
| 018B | 3C | 494 | | MOVD | P4,A | |
| 018C | B92E | 495 | | MOV | MP,#RMCNT | |

| LOC | OBJ | LINE | | SOURCE STATEMENT | | |
|---|---|---|---|---|---|---|
| 018E | 11 | 496 | | INC | @MP | |
| 018F | F1 | 497 | | MOV | A,@MP | |
| 0190 | C6A1 | 498 | | JZ | SEEK6 | |
| 0192 | B83D | 499 | | MOV | DP,#HEADER | |
| 0194 | B000 | 500 | | MOV | @DP,#0 | |
| 0196 | 14E6 | 501 | | CALL | ENTC | |
| 0198 | F0 | 502 | | MOV | A,@DP | |
| 0199 | C698 | 503 | | JZ | $-1 | |
| 019B | 35 | 504 | | DIS | TCNTI | |
| 019C | 2404 | 505 | | JMP | SEEKO | |
| 019E | 2307 | 506 | SEEK5: | MOV | A,#INTDS | |
| 01A0 | 3C | 507 | | MOVD | P4,A | |
| 01A1 | 14E6 | 508 | SEEK6: | CALL | ENTC | |
| 01A3 | B835 | 509 | SEEKNC: | MOV | DP,#SKINP | |
| 01A5 | F0 | 510 | | MOV | A,@DP | |
| 01A6 | 96A3 | 511 | | JNZ | SEEKNC | |
| 01A8 | 44C4 | 512 | | JMP | CMDXIT | |
| | | 513 | ; | | | |
| | | 514 | ; | | | |
| 01AA | | 515 | TRKFL3 | EQU | $ | |
| 01AA | B834 | 516 | IDLE: | MOV | DP,#DSTS | |
| 01AC | F0 | 517 | | MOV | A,@DP | |
| 01AD | F2C8 | 518 | | JB7 | WOBFE | ; SEE IF STATUS PENDING |
| | | 519 | ; | | | |
| 01AF | B833 | 520 | | MOV | DP,#DSTAT | |
| 01B1 | F0 | 521 | | MOV | A,@DP | |
| 01B2 | A8 | 522 | | MOV | DP,A | |
| 01B3 | 53B0 | 523 | | ANL | A,#(CPE+OT+SE) | |
| 01B5 | 96BD | 524 | | JNZ | SSPEND | |
| 01B7 | F8 | 525 | | MOV | A,DP | |
| 01B8 | 02 | 526 | IDLE2: | OUT | DBB,A | |
| 01B9 | 5415 | 527 | | CALL | PRCMD | |
| 01BB | 24AA | 528 | | JMP | IDLE | |
| | | 529 | ; | | | |
| | | 530 | ; | SSPEND - SET STATUS PENDING | | |
| | | 531 | ; | | | |
| 01BD | F8 | 532 | SSPEND: | MOV | A,DP | |
| 01BE | 02 | 533 | | OUT | DBB,A | |
| 01BF | B834 | 534 | | MOV | DP,#DSTS | |
| 01C1 | F0 | 535 | | MOV | A,@DP | |
| 01C2 | 4380 | 536 | | ORL | A,#STPEND | |
| 01C4 | A0 | 537 | | MOV | @DP,A | |
| | | 538 | | MOVE | STS,A | |
| 01C6 | 24AA | 542 | | JMP | IDLE | |
| | | 543 | ; | | | |

| LOC | OBJ | LINE | SOURCE STATEMENT | | |
|---|---|---|---|---|---|
| | | 544 | ; | WOBFE - WAIT FOR OUTPUT BUFFER EMPTY | |
| | | 545 | ; | | |
| 01C8 | 86AA | 546 | WOBFE: | JOBF | IDLE |
| 01CA | B834 | 547 | | MOV | DP,#DSTS |
| 01CC | F0 | 548 | | MOV | A,@DP |
| 01CD | 537F | 549 | | ANL | A,#NOT STPEND |
| 01CF | A0 | 550 | | MOV | @DP,A |
| | | 551 | | MOVE | STS,A |
| 01D1 | B833 | 555 | | MOV | DP,#DSTAT |
| 01D3 | F0 | 556 | | MOV | A,@DP |
| 01D4 | 534F | 557 | | ANL | A,#NOT(CPE+OT+SE) |
| 01D6 | A0 | 558 | | MOV | @DP,A |
| 01D7 | 24B8 | 559 | | JMP | IDLE2 |
| 01D9 | 74D1 | 560 | RES11: | CALL | CLRAM |
| | | 561 | ; | | |
| | | 562 | ; | CONTINUATION OF POWER ON RESET ROUTINE | |
| | | 563 | ; | | |
| 01DB | 09 | 564 | RES2: | IN | A,P1 |
| 01DC | B2DB | 565 | | JB5 | RES2 |
| 01DE | 2309 | 566 | | MOV | A,#09 |
| 01E0 | 3D | 567 | | MOVD | P5,A |
| | | 568 | ; | | |
| | | 569 | ; | CAP DISCHARGE | |
| | | 570 | ; | | |
| 01E1 | 2307 | 571 | REST: | MOV | A,#INTDS ; DISABLE INTEGRATOR |
| 01E3 | 3C | 572 | | MOVD | P4,A |
| 01E4 | B935 | 573 | | MOV | MP,#SKINP |
| 01E6 | B101 | 574 | | MOV | @MP,#1 |
| 01E8 | B938 | 575 | | MOV | MP,#HCNT |
| 01EA | B1FC | 576 | | MOV | @MP,#-4 |
| | | 577 | ; | | |
| | | 578 | ; | DUMP SERVO BURST CAPACITORS | |
| | | 579 | ; | | |
| 01EC | 99EF | 580 | | ANL | P1,#DUMP |
| 01EE | 8910 | 581 | | ORL | P1,#NOT DUMP |
| 01F0 | 14E6 | 582 | | CALL | ENTC ; ENABLE TIMER COUNTER FOR TRACK FOLLOWING |
| 01F2 | 45 | 583 | | STRT | CNT |
| 01F3 | B83D | 584 | | MOV | DP,#HEADER |
| 01F5 | F0 | 585 | RES3: | MOV | A,@DP |
| 01F6 | C6F5 | 586 | | JZ | RES3 |
| 01F8 | 24AA | 587 | | JMP | IDLE ; ENTER IDLE LOOP |
| | | 588 | $ | EJECT | |
| 0200 | | 589 | | ORG | 200H |
| | | 590 | ; | | |

| LOC | OBJ | LINE | | SOURCE STATEMENT | | |
|---|---|---|---|---|---|---|
| | | 591 | ; | CMDINT - COMMAND INTERRUPT | | |
| | | 592 | ; | READ DATA BUS BUFFER AND STORE IN COMMAND LIST | | |
| | | 593 | ; | | | |
| 0200 | 22 | 594 | CMDINT: | IN | A,DBB | ; READ DATA BUS BUFFER |
| 0201 | 760A | 595 | | JF1 | CINT1 | ; BRANCH ON COMMAND WRITE |
| 0203 | B820 | 596 | CINTO: | MOV | CP,#CMDLIST | ; IGNORE PRESENTLY ASSEMBLED COMMAND |
| 0205 | 27 | 597 | | CLR | A | |
| 0206 | A0 | 598 | | MOV | @CP,A | |
| 0207 | AA | 599 | | MOV | BC,A | |
| 0208 | FF | 600 | | MOV | A,SA1 | |
| 0209 | 93 | 601 | | RETR | | |
| 020A | A0 | 602 | CINT1: | MOV | @CP,A | ; STORE BYTE WHERE CP POINTS |
| 020B | 18 | 603 | | INC | CP | ; BUMP POINTER TO NEXT AVAILABLE BYTE |
| 020C | 1A | 604 | | INC | BC | ; INCREMENT COUNTER OF NUMBER OF BYTES |
| 020D | FF | 605 | | MOV | A,SA1 | ; RESTORE ACCUMULATOR |
| 020E | 93 | 606 | | RETR | | ; RETURN AND RESTORE STATUS |
| | | 607 | $ | EJECT | | |
| | | 608 | ; | | | |
| | | 609 | ; | CSUSP? SUSPEND PROCESSING | | |
| | | 610 | ; | | | |
| 020F | 1A | 611 | CSUSP3: | INC | BC | |
| 0210 | 1A | 612 | CSUSP2: | INC | BC | |
| 0211 | 1A | 613 | CSUSP1: | INC | BC | |
| 0212 | 05 | 614 | PRCMD0: | EN | I | ; ENABLE IBF INTERRUPTS |
| 0213 | C5 | 615 | | SEL | RB0 | |
| 0214 | 83 | 616 | | RET | | |
| | | 617 | ; | | | |
| | | 618 | ; | PRCMD - ROUTINE TO PROCESS A COMMAND | | |
| | | 619 | ; | INTERRUPTS ARE DISABLED | | |
| | | 620 | ; | | | |
| 0215 | D5 | 621 | PRCMD: | SEL | RB1 | |
| 0216 | B920 | 622 | | MOV | WP,#CMDLIST | |
| 0218 | F1 | 623 | | MOV | A,@WP | |
| 0219 | C612 | 624 | | JZ | PRCMD0 | |
| 021B | 15 | 625 | PRCMD1: | DIS | I | |
| 021C | 0310 | 626 | | ADD | A,#010H | |
| 021E | E6B6 | 627 | | JNC | ILCMD | |
| 0220 | F1 | 628 | | MOV | A,@WP | |
| 0221 | B3 | 629 | | JMPP | @A | ; DISPATCH ON COMMAND |
| | | 630 | $ | EJECT | | |
| | | 631 | ; | | | |
| | | 632 | ; | SET LOWER CYLINDER | | |
| | | 633 | ; | DISK COMMAND 0 | | |
| | | 634 | ; | 1 PARAMETER | | |
| | | 635 | ; | | | |

| LOC | OBJ | LINE | | SOURCE STATEMENT | | |
|---|---|---|---|---|---|---|
| 0222 | EA26 | 636 | SETC: | DJNZ | BC,SETLC1 | ; CHECK FOR BC = 2 |
| 0224 | 4411 | 637 | | JMP | CSUSP1 | ; SUSPEND IF ONLY 1 BYTE PRESENT |
| 0226 | EAB6 | 638 | SETLC1: | DJNZ | BC,CMDER | ; COMMAND ERROR IF BC > 2 |
| 0228 | B83E | 639 | | MOV | CP,#LOWCYL | ; ADDRESS OF LOWER CYLINDER |
| 022A | 4434 | 640 | | JMP | SETCYL | |
| | | 641 | ; | | | |
| | | 642 | ; | SET UPPER CYLINDER | | |
| | | 643 | ; | DISK COMMAND 1 | | |
| | | 644 | ; | 1 PARAMETER | | |
| | | 645 | ; | | | |
| 022C | EA30 | 646 | SETUC: | DJNZ | BC,SETUC1 | ; CHECK FOR BC = 2 |
| 022E | 4411 | 647 | | JMP | CSUSP1 | ; SUSPEND IF ONLY 1 BYTE PRESENT |
| 0230 | EAB6 | 648 | SETUC1: | DJNZ | BC,CMDER | ; COMMAND ERROR IF BC > 2 |
| 0232 | B83F | 649 | | MOV | CP,#UPRCYL | ; ADDRESS OF UPPER CYLINDER |
| 0234 | 19 | 650 | SETCYL: | INC | WP | |
| 0235 | F1 | 651 | | MOV | A,@WP | ; PULL PARAMETER |
| 0236 | A0 | 652 | | MOV | @CP,A | ; PUT IN DATA MEMORY |
| 0237 | 44C4 | 653 | | JMP | CMDXIT | ; EXIT COMMAND |
| | | 654 | $ | EJECT | | |
| | | 655 | ; | | | |
| | | 656 | ; | SELECT HEAD | | |
| | | 657 | ; | DISK COMMAND 2 | | |
| | | 658 | ; | 1 PARAMETER | | |
| | | 659 | ; | | | |
| 0239 | EA3D | 660 | SELHD: | DJNZ | BC,SELHDA | ; CHECK FOR BC = 2 |
| 023B | 4411 | 661 | | JMP | CSUSP1 | ; SUSPEND IF ONLY 1 BYTE PRESENT |
| 023D | EAB6 | 662 | SELHDA: | DJNZ | BC,CMDER | ; COMMAND ERROR IF BC > 2 |
| 023F | 19 | 663 | | INC | WP | ; BUMP WP TO POINT AT PARAMETER |
| 0240 | 5444 | 664 | | CALL | SETHD | |
| 0242 | 44C4 | 665 | | JMP | CMDXIT | |
| | | 666 | ; | | | |
| | | 667 | ; | SET HEAD SUBROUTINE | | |
| | | 668 | ; | | | |
| 0244 | 2309 | 669 | SETHD: | MOV | A,#1001B | |
| 0246 | 9D | 670 | | ANLD | P5,A | |
| 0247 | F1 | 671 | | MOV | A,@WP | |
| 0248 | 5301 | 672 | | ANL | A,#0001B | |
| 024A | E7 | 673 | | RL | A | |
| 024B | E7 | 674 | | RL | A | |
| 024C | 8D | 675 | | ORLD | P5,A | |
| 024D | 83 | 676 | | RET | | |
| | | 677 | $ | EJECT | | |
| | | 678 | ; | | | |
| | | 679 | ; | DISK BUS CONTROL | | |
| | | 680 | ; | DISK COMMAND 6 | | |

| LOC | OBJ | LINE | | SOURCE STATEMENT | | |
|---|---|---|---|---|---|---|
| | | 681 | ; | | | |
| | | 682 | ; | 1 PARAMETER | | |
| 024E | EA52 | 683 | DBUSC: | DJNZ | BC,DBUSC1 | ; CHECK FOR BC = 2 |
| 0250 | 4411 | 684 | | JMP | CSUSP1 | |
| 0252 | EAB6 | 685 | DBUSC1: | DJNZ | BC,CMDER | |
| 0254 | 19 | 686 | | INC | WP | |
| 0255 | F1 | 687 | | MOV | A,@WP | |
| 0256 | F250 | 688 | | JB7 | DBUSD | ; BRANCH TO DISABLE DISK BUS |
| 0258 | 230E | 689 | DBUSEN: | MOV | A,#DBEN0 | |
| 025A | 9D | 690 | | ANLD | P5,A | |
| 025B | 44C4 | 691 | | JMP | CMDXIT | |
| 025D | 2309 | 692 | DBUSD: | MOV | A,#DBEN1 | |
| 025F | 8D | 693 | | ORLD | P5,A | |
| 0260 | 44C4 | 694 | | JMP | CMDXIT | |
| | | 695 | ; | | | |
| | | 696 | ; | SEEK4B - SEEK WITH PARAMETERS | | |
| | | 697 | ; | | | |
| 0262 | 09 | 698 | SEEK4B: | IN | A,P1 | |
| 0263 | B2B6 | 699 | | JB5 | CMDER1 | |
| 0265 | EA69 | 700 | | DJNZ | BC,SK41 | ; CHECK NUMBER OF PARAMETERS |
| 0267 | 4411 | 701 | | JMP | CSUSP1 | |
| 0269 | EA6D | 702 | SK41: | DJNZ | BC,SK42 | |
| 026B | 4410 | 703 | | JMP | CSUSP2 | |
| 026D | EA71 | 704 | SK42: | DJNZ | BC,SK43 | |
| 026F | 440F | 705 | | JMP | CSUSP3 | |
| 0271 | EAB6 | 706 | SK43: | DJNZ | BC,CMDER | |
| 0273 | 19 | 707 | | INC | WP | |
| 0274 | 5444 | 708 | | CALL | SETHD | |
| 0276 | 19 | 709 | | INC | WP | |
| 0277 | B83E | 710 | | MOV | CP,#LOWCYL | |
| 0279 | F1 | 711 | | MOV | A,@WP | |
| 027A | A0 | 712 | | MOV | @CP,A | |
| 027B | 19 | 713 | | INC | WP | |
| 027C | 18 | 714 | | INC | CP | |
| 027D | F1 | 715 | | MOV | A,@WP | |
| 027E | A0 | 716 | | MOV | @CP,A | |
| 027F | 4486 | 717 | | JMP | STSEEK | ; BRANCH TO START SEEK |
| | | 718 | ; | | | |
| | | 719 | ; | SEEK1B - ONE BYTE SEEK COMMAND | | |
| | | 720 | ; | | | |
| 0281 | 09 | 721 | SEEK1B: | IN | A,P1 | |
| 0282 | B2B6 | 722 | | JB5 | CMDER1 | |
| 0284 | EAB6 | 723 | | DJNZ | BC,CMDER | ; CANT SEEK IF TOO MANY BYTES |
| 0286 | B93E | 724 | STSEEK: | MOV | WP,#LOWCYL | |
| 0288 | F1 | 725 | | MOV | A,@WP | |

```
0289 039C        726         ADD     A,#LOW MAXTR
028B 19          727         INC     WP
028C F1          728         MOV     A,@WP
028D 13FD        729         ADDC    A,#HIGH MAXTR
028F F6B6        730         JC      PARMER
0291 35          731         DIS     TCNTI
0292 C5          732         SEL     RB0
0293 B83E        733         MOV     R0,#LOWCYL
0295 F0          734         MOV     A,@R0
0296 0320        735         ADD     A,#CYLOFF
0298 AF          736         MOV     AL,A
0299 B83F        737         MOV     R0,#UPRCYL
029B F0          738         MOV     A,@R0
029C 1300        739         ADDC    A,#0
029E AE          740         MOV     AH,A
029F B93C        741         MOV     MP,#DL
02A1 74AB        742         CALL    DSTA
02A3 2400        743         JMP     SEEK
                 744 ;
                 745 ;       PARK - SEEK TRACK IN LANDING AREA
                 746 ;
02A5 09          747 PARK:   IN      A,P1
02A6 B2B6        748         JB5     CMDER1
02A8 EAB6        749         DJNZ    BC,CMDER
02AA 35          750         DIS     TCNTI
02AB C5          751         SEL     RB0
02AC BE02        752         MOV     AH,#HIGH LANDTR
02AE BFCF        753         MOV     AL,#LOW LANDTR
02B0 B93C        754         MOV     MP,#DL
02B2 74AB        755         CALL    DSTA
02B4 2400        756         JMP     SEEK
                 757 $EJECT
                 758 ;
                 759 ;       ILCMD - COME HERE VIA DISPATCH TABLE FOR UNDEFINED COMMANDS
                 760 ;
02B6             761 PARMER  EQU     $
02B6             762 CMDER   EQU     $
02B6             763 CMDER1  EQU     $
02B6 B933        764 ILCMD:  MOV     WP,#DSTAT           ; SET COMMAND/PARAMETER ERROR
02B8 F1          765         MOV     A,@WP
02B9 4380        766         ORL     A,#CPE
02BB A1          767         MOV     @WP,A
02BC 02          768         OUT     DBB,A
02BD B934        769         MOV     WP,#DSTS
02BF F1          770         MOV     A,@WP
```

| LOC | OBJ | LINE | SOURCE STATEMENT | | | |
|---|---|---|---|---|---|---|
| 02C0 | 4380 | 771 | | ORL | A,#STPEND | |
| 02C2 | A1 | 772 | | MOV | @WP,A | |
| | | 773 | | MOVE | STS,A | |
| | | 777 | ; | | | |
| | | 778 | ; CMDXIT - ALL COMMANDS COME HERE WHEN THEY FINISH | | | |
| | | 779 | ; | | | |
| 02C4 | D5 | 780 | CMDXIT: | SEL | RB1 | |
| 02C5 | B820 | 781 | | MOV | CP,#CMDLIST | ; ADDRESS OF COMMAND LIST |
| 02C7 | 27 | 782 | | CLR | A | |
| 02C8 | A0 | 783 | | MOV | @CP,A | ; SET COMMAND TO 0 ( NO COMMAND ACTIVE ) |
| 02C9 | AA | 784 | | MOV | BC,A | ; SET BYTE COUNT TO 0 ALSO |
| 02CA | C5 | 785 | | SEL | RB0 | |
| 02CB | A5 | 786 | | CLR | F1 | |
| 02CC | 05 | 787 | | EN | I | |
| 02CD | 83 | 788 | | RET | | |
| | | 789 | | EJECT | $ | |
| | | 790 | ; | | | |
| 02CE | FD | 791 | RTDAC: | MOV | A,RLL | |
| 02CF | E7 | 792 | | RL | A | |
| 02D0 | E7 | 793 | | RL | A | |
| 02D1 | 3E | 794 | | MOVD | P6,A | |
| 02D2 | FC | 795 | | MOV | A,RH | |
| 02D3 | 3A | 796 | | OUTL | P2,A | |
| 02D4 | 99F3 | 797 | | ANL | P1,#WRVCM | |
| 02D6 | 89FF | 798 | | ORL | P1,#ALL1S | |
| 02D8 | 83 | 799 | | RET | | |
| | | 800 | ; | | | |
| 02D9 | FD | 801 | BUMP: | MOV | A,RLL | |
| 02DA | 6F | 802 | | ADD | A,AL | |
| 02DB | AD | 803 | | MOV | RLL,A | |
| 02DC | FC | 804 | | MOV | A,RH | |
| 02DD | 7E | 805 | | ADDC | A,AH | |
| 02DE | AC | 806 | | MOV | RH,A | |
| 02DF | 83 | 807 | | RET | | |
| | | 808 | | EJECT | $ | |
| 02F0 | | 809 | | ORG | 2F0H | |
| | | 810 | ; | | | |
| | | 811 | ; DISK POSITIONER COMMAND TRANSFER VECTOR | | | |
| | | 812 | ; LENGTH : 16 BYTES | | | |
| | | 813 | ; ENTRIES : ADDRESS ON PAGE 2 OF A PROCESSING ROUTINE | | | |
| | | 814 | ; | | | |
| 02F0 | 22 | 815 | DTVEC: | DB | LOW SETLC | ; SET LOWER CYLINDER |
| 02F1 | 2C | 816 | | DB | LOW SETUC | ; SET UPPER CYLINDER |
| 02F2 | 39 | 817 | | DB | LOW SELHD | ; SELECT HEAD |
| 02F3 | 81 | 818 | | DB | LOW SEEK1B | ; SEEK W/O PARAMETERS |

| LOC | OBJ | LINE | SOURCE STATEMENT | | | |
|---|---|---|---|---|---|---|
| 02F4 | A5 | 819 | DB | LOW | PARK | ; PARK - SEEK TRACK IN LANDING AREA |
| 02F5 | B6 | 820 | DB | LOW | ILCMD | |
| 02F6 | 4E | 821 | DB | LOW | DBUSC | ; CLEAR FAULT |
| 02F7 | 62 | 822 | DB | LOW | SEEK4B | ; DISK BUS CONTROL |
| 02F8 | B6 | 823 | DB | LOW | ILCMD | ; SEEK WITH PARAMETERS |
| 02F9 | B6 | 824 | DB | LOW | ILCMD | |
| 02FA | B6 | 825 | DB | LOW | ILCMD | |
| 02FB | B6 | 826 | DB | LOW | ILCMD | |
| 02FC | B6 | 827 | DB | LOW | ILCMD | |
| 02FD | B6 | 828 | DB | LOW | ILCMD | |
| 02FE | B6 | 829 | DB | LOW | ILCMD | |
| 02FF | B6 | 830 | DB | LOW | ILCMD | |
| | | 831 | EJECT | | | |
| | | 832 | ; | | | |
| | | 833 | ; DELTA TRACK AND ZONE TABLE | | | |
| | | 834 | ; | | | |
| 0300 | 00 | 835 | DTZTAB: DB | 000, 000, 008, 024 | | |
| 0301 | 00 | | | | | |
| 0302 | 08 | | | | | |
| 0303 | 18 | | | | | |
| 0304 | 18 | 836 | DB | 024, 032, 040, 056 | | |
| 0305 | 20 | | | | | |
| 0306 | 28 | | | | | |
| 0307 | 38 | | | | | |
| 0308 | 38 | 837 | DB | 056, 064, 072, 088 | | |
| 0309 | 40 | | | | | |
| 030A | 48 | | | | | |
| 030B | 58 | | | | | |
| 030C | 58 | 838 | DB | 088, 096, 104, 120 | | |
| 030D | 60 | | | | | |
| 030E | 68 | | | | | |
| 030F | 78 | | | | | |
| 0310 | 78 | 839 | DB | 120, 128, 128, 136 | | |
| 0311 | 80 | | | | | |
| 0312 | 80 | | | | | |
| 0313 | 88 | | | | | |
| 0314 | 88 | 840 | DB | 136, 152, 160, 168 | | |
| 0315 | 98 | | | | | |
| 0316 | A0 | | | | | |
| 0317 | A8 | | | | | |
| 0318 | A8 | 841 | DB | 168, 184, 192, 200 | | |
| 0319 | B8 | | | | | |
| 031A | C0 | | | | | |
| 031B | C8 | | | | | |
| 031C | C8 | 842 | DB | 200, 216, 224, 232 | | |

| LOC | OBJ | LINE | SOURCE STATEMENT |
|---|---|---|---|
| 031D | D8 | | |
| 031E | E0 | | |
| 031F | E8 | | |
| 0320 | E8 | 843 | DB    232, 248, 255, 255 |
| 0321 | F8 | | |
| 0322 | FF | | |
| 0323 | FF | | |
| | | 844 | $ EJECT |
| | | 845 | ; |
| | | 846 | ; BANG BANG TABLE |
| | | 847 | ; 32 ENTRIES |
| | | 848 | ; EACH ENTRY CORRESPONDS TO A TIME DELAY IN 80 MICROSECOND INTERVALS |
| | | 849 | ; WHICH SHOULD TAKE US TO THE VICINITY OF THE DESTINATION TRACK |
| | | 850 | ; THE TRACK GROUPS ARE 32 TRACKS WIDE |
| | | 851 | ; |
| | | 852 | ; |
| 0324 | 00 | 853 RTNZ: | DB    000,000,000 |
| 0325 | 00 | | |
| 0326 | 00 | | |
| 0327 | 00 | 854 | DB    000,070,079,086,093,100,106,111 |
| 0328 | 46 | | |
| 0329 | 4F | | |
| 032A | 56 | | |
| 032B | 5D | | |
| 032C | 64 | | |
| 032D | 6A | | |
| 032E | 6F | | |
| 032F | 75 | 855 | DB    117,122,127,132,137,141,145,149 |
| 0330 | 7A | | |
| 0331 | 7F | | |
| 0332 | 84 | | |
| 0333 | 89 | | |
| 0334 | 8D | | |
| 0335 | 91 | | |
| 0336 | 95 | | |
| 0337 | 99 | 856 | DB    153,157,161,165,169,172,176,179 |
| 0338 | 9D | | |
| 0339 | A1 | | |
| 033A | A5 | | |
| 033B | A9 | | |
| 033C | AC | | |
| 033D | B0 | | |
| 033E | B3 | | |
| 033F | B7 | 857 | DB    183,186,190,193,196,199,202,205 |
| 0340 | BA | | |

| | | | |
|---|---|---|---|
| 0341 BE | | | |
| 0342 C1 | | | |
| 0343 C4 | | | |
| 0344 C7 | | | |
| 0345 CA | | | |
| 0346 CD | | | |
| 0347 D0 | 858 | DB | 208,211,214,217,220,223,225,228 |
| 0348 D3 | | | |
| 0349 D6 | | | |
| 034A D9 | | | |
| 034B DC | | | |
| 034C DF | | | |
| 034D E1 | | | |
| 034E E4 | | | |
| 034F E4 | 859 | DB | 228,228,228,228,228,228,228,228 |
| 0350 E4 | | | |
| 0351 E4 | | | |
| 0352 E4 | | | |
| 0353 E4 | | | |
| 0354 E4 | | | |
| 0355 E4 | | | |
| 0356 E4 | | | |
| 0357 E4 | 860 | DB | 228,228,228,228,228,228,228,228 |
| 0358 E4 | | | |
| 0359 E4 | | | |
| 035A E4 | | | |
| 035B E4 | | | |
| 035C E4 | | | |
| 035D E4 | | | |
| 035E E4 | | | |
| 035F E4 | 861 | DB | 228,228,228,228 |
| 0360 E4 | | | |
| 0361 E4 | | | |
| 0362 E4 | | | |
| 0363 E4 | | | |
| | 862 ; | | |
| | 863 RTO: | | |
| 0364 00 | | DB | 000,000,000,000,020,022,023 |
| 0365 00 | | | |
| 0366 00 | | | |
| 0367 00 | | | |
| 0368 00 | | | |
| 0369 14 | | | |
| 036A 16 | | | |
| 036B 17 | | | |
| 036C 19 | 864 | DB | 025,026,028,029,030,032,033,034 |

| LOC | OBJ | LINE | SOURCE STATEMENT |
|---|---|---|---|
| 036D | 1A | | |
| 036E | 1C | | |
| 036F | 1D | | |
| 0370 | 1E | | |
| 0371 | 20 | | |
| 0372 | 21 | | |
| 0373 | 22 | | |
| 0374 | 23 | 865 | DB 035,036,037,038,039,040,041,042 |
| 0375 | 24 | | |
| 0376 | 25 | | |
| 0377 | 26 | | |
| 0378 | 27 | | |
| 0379 | 28 | | |
| 037A | 29 | | |
| 037B | 2A | | |
| 037C | 2B | 866 | DB 043,044,045,046,047,047,048,049 |
| 037D | 2C | | |
| 037E | 2D | | |
| 037F | 2E | | |
| 0380 | 2F | | |
| 0381 | 2F | | |
| 0382 | 30 | | |
| 0383 | 31 | | |
| 0384 | 32 | 867 | DB 050,051,051,052,053,054,054,055 |
| 0385 | 33 | | |
| 0386 | 33 | | |
| 0387 | 34 | | |
| 0388 | 35 | | |
| 0389 | 36 | | |
| 038A | 36 | | |
| 038B | 37 | | |
| 038C | 38 | 868 | DB 056,056,057,058,058,059,060,060 |
| 038D | 38 | | |
| 038E | 39 | | |
| 038F | 3A | | |
| 0390 | 3A | | |
| 0391 | 3B | | |
| 0392 | 3C | | |
| 0393 | 3C | | |
| 0394 | 3D | 869 | DB 061,062,062,063,063,064,065,065 |
| 0395 | 3E | | |
| 0396 | 3E | | |
| 0397 | 3F | | |
| 0398 | 3F | | |
| 0399 | 40 | | |

| | | | | |
|---|---|---|---|---|
| 039A | 41 | | | |
| 039B | 41 | | | |
| 039C | 42 | | | |
| 039D | 42 | | | |
| 039E | 43 | | | |
| 039F | 44 | | | |
| 03A0 | 44 | | | |
| 03A1 | 45 | | | |
| 03A2 | 45 | | | |
| 03A3 | 46 | | 870 | DB | 066,066,066,067,068,068,069,069,070 |
| | | | | |
| 03A4 | 83 | | 871 | EJECT |
| | | | 872 | RET |
| | | | 873 | ; |
| | | | 874 | ; DOUBLE PRECISION LOAD AND SOTRE |
| | | | 875 | ; |
| 03A5 | FD | | 876 DSTR: | MOV | A,RLL |
| 03A6 | A1 | | 877 | MOV | @MP,A |
| 03A7 | C9 | | 878 | DEC | MP |
| 03A8 | FC | | 879 | MOV | A,RH |
| 03A9 | A1 | | 880 | MOV | @MP,A |
| 03AA | 83 | | 881 | RET |
| 03AB | FF | | 882 DSTA: | MOV | A,AL |
| 03AC | A1 | | 883 | MOV | @MP,A |
| 03AD | C9 | | 884 | DEC | MP |
| 03AE | FE | | 885 | MOV | A,AH |
| 03AF | A1 | | 886 | MOV | @MP,A |
| 03B0 | 83 | | 887 | RET |
| 03B1 | F1 | | 888 DLDR: | MOV | A,@MP |
| 03B2 | AD | | 889 | MOV | RLL,A |
| 03B3 | C9 | | 890 | DEC | MP |
| 03B4 | F1 | | 891 | MOV | A,@MP |
| 03B5 | AC | | 892 | MOV | RH,A |
| 03B6 | 83 | | 893 | RET |
| 03B7 | F1 | | 894 DLDA: | MOV | A,@MP |
| 03B8 | AF | | 895 | MOV | AL,A |
| 03B9 | C9 | | 896 | DEC | MP |
| 03BA | F1 | | 897 | MOV | A,@MP |
| 03BB | AE | | 898 | MOV | AH,A |
| 03BC | 83 | | 899 | RET |
| | | | 900 | ; |
| 03BD | F1 | | 901 DLDAN: | MOV | A,@MP |
| 03BE | 37 | | 902 | CPL | A |
| 03BF | 0301 | | 903 | ADD | A,#001 |
| 03C1 | AF | | 904 | MOV | AL,A |
| 03C2 | C9 | | 905 | DEC | MP |

| LOC  | OBJ   | LINE |        | SOURCE STATEMENT |                |                                              |
|------|-------|------|--------|------------------|----------------|----------------------------------------------|
| 03C3 | F1    | 906  |        | MOV              | A,@MP          |                                              |
| 03C4 | 37    | 907  |        | CPL              | A              |                                              |
| 03C5 | 1300  | 908  |        | ADDC             | A,#000         |                                              |
| 03C7 | AE    | 909  |        | MOV              | AH,A           |                                              |
| 03C8 | 83    | 910  |        | RET              |                |                                              |
|      |       | 911  | ;      |                  |                |                                              |
| 03C9 | FF    | 912  | DADD:  | MOV              | A,AL           |                                              |
| 03CA | 61    | 913  |        | ADD              | A,@MP          |                                              |
| 03CB | AD    | 914  |        | MOV              | RLL,A          |                                              |
| 03CC | C9    | 915  |        | DEC              | MP             |                                              |
| 03CD | FE    | 916  |        | MOV              | A,AH           |                                              |
| 03CE | 71    | 917  |        | ADDC             | A,@MP          |                                              |
| 03CF | AC    | 918  |        | MOV              | RH,A           |                                              |
| 03D0 | 83    | 919  |        | RET              |                |                                              |
|      |       | 920  | ;      |                  |                |                                              |
|      |       | 921  | ;      CLRAM - CLEAR DATA RAM         |                |                                              |
|      |       | 922  | ;      |                  |                |                                              |
| 03D1 | BA20  | 923  | CLRAM: | MOV              | TM,#32         | ; INITIALIZE DATA RAM TO 0'S                 |
| 03D3 | B820  | 924  |        | MOV              | DP,#CMDLIST    |                                              |
| 03D5 | 27    | 925  |        | CLR              | A              |                                              |
| 03D6 | A0    | 926  | CLRAM1:| MOV              | @DP,A          |                                              |
| 03D7 | 18    | 927  |        | INC              | DP             |                                              |
| 03D8 | EAD6  | 928  |        | DJNZ             | TM,CLRAM1      | ; LOOP UNTIL DATA RAM IS CLEAR               |
|      |       | 929  | ;      |                  |                |                                              |
|      |       | 930  | ;      SETCOM - SETUP COMMUNICATIONS  |                |                                              |
|      |       | 931  | ;      |                  |                |                                              |
| 03DA | D5    | 932  | SETCOM:| SEL              | RB1            | ; COMM REGISTERS ARE IN BANK 0               |
| 03DB | B820  | 933  |        | MOV              | CP,#CMDLIST    | ; MAKE COMMAND POINTER POINT TO COMMAND LIST |
| 03DD | 27    | 934  |        | CLR              | A              |                                              |
| 03DE | AA    | 935  |        | MOV              | BC,A           |                                              |
|      |       | 936  |        | MOVE             | STS,A          |                                              |
| 03E0 | 02    | 940  |        | OUT              | DBB,A          |                                              |
| 03E1 | C5    | 941  |        | SEL              | RB0            |                                              |
| 03E2 | A5    | 942  |        | CLR              | F1             |                                              |
| 03E3 | B93C  | 943  |        | MOV              | MP,#DL         |                                              |
| 03E5 | BE02  | 944  |        | MOV              | AH,#HIGH LANDTR|                                              |
| 03E7 | BFCF  | 945  |        | MOV              | AL,#LOW LANDTR |                                              |
| 03E9 | 74AB  | 946  |        | CALL             | DSTA           |                                              |
| 03EB | 83    | 947  |        | RET              |                |                                              |
|      |       | 948  | ;      |                  |                |                                              |
|      |       | 949  | ;      RESET - ENTER HERE IF POWER ON OR RESET = 0 |  |                                              |
|      |       | 950  | ;      |                  |                |                                              |
| 03EC | 16EE  | 951  | RESET: | JTF              | RES1           |                                              |
| 03EE | 89FF  | 952  | RES1:  | ORL              | P1,#ALL1S      | ; MAKE P1 ALL INPUTS                         |
| 03F0 | 14EF  | 953  |        | CALL             | WDAC0          | ; ZERO THE DAC OUTPUT                        |

```
03F2  23FF           954          MOV   A,#ALL1S
03F4  3C             955          MOVD  P4,A
03F5  3F             956          MOVD  P7,A
03F6  3D             957          MOVD  P5,A
03F7  99B7           958          ANL   P1,#RDADC
03F9  0A             959          IN    A,P2
03FA  8948           960          ORL   P1,#NOT RDADC      ; INITIALIZE EXPANDER PORTS TO OFF
03FC  24D9           961          JMP   RES11
0000                 962          END   0
```

USER SYMBOLS

| | | | | | | | |
|---|---|---|---|---|---|---|---|
| ADC    | 00BF | AH      | 0006 | AL      | 0007 | ALL1S   | 00FF | BC      | 0002 | BMA     | 0036 | BUMP    | 02D9 | CINTO   | 0203 |
| CINT1  | 020A | CLRAM   | 03D1 | CLRAM1  | 03D6 | CMDER   | 02B6 | CMDER1  | 02B6 | CMDINT  | 0200 | CMDLIS  | 0020 | CMDXIT  | 02C4 |
| CP     | 0000 | CPE     | 0080 | CSUSP1  | 0211 | CSUSP2  | 020F | CSUSP3  | 020F | CYLOFF  | 0020 | DADD    | 03C9 | DBEN0   | 000E |
| DBEN1  | 0009 | DBUSC   | 024E | DBUSC1  | 0252 | DBUSD   | 0210 | DBUSEN  | 0258 | DELDN   | 0181 | DELUP   | 0169 | DH      | 003B |
| DIR    | 0030 | DL      | 003C | DLDA    | 0387 | DLDAN   | 025D | DLDR    | 03B1 | DP      | 0000 | DSTA    | 03AB | DSTAT   | 0033 |
| DSTR   | 03A5 | DSTS    | 0034 | DTVEC   | 02F0 | DTZTAB  | 0300 | DUMP    | 00EF | ENTC    | 00E6 | ENTC1   | 00ED | GONEG   | 0156 |
| GPOS   | 015C | HCNT    | 0038 | HEADER  | 003D | HH      | 0039 | HL      | 003A | IDLE    | 01AA | IDLE2   | 01B8 | ILCMD   | 02B6 |
| INTDS  | 0007 | IOSTB   | 00F7 | IRMUP   | 0160 | LANDTR  | 02CF | LOWCYL  | 003E | MAXTR   | FD9C | MNEG    | 0083 | MOVE    | 0000 |
| MP     | 0001 | MPOS    | 007F | MUXAD0  | 000C | MUXAD3  | 000F | OT      | 0020 | PARK    | 02A5 | PARMER  | 02B6 | POSG    | 000F |
| PRCMD  | 0215 | PRCMD0  | 0212 | PRCMD1  | 021B | RAMDN   | 0183 | RAMUP   | 016B | RCNTX   | 00E0 | RDADC   | 00B7 | RES1    | 03EE |
| RES11  | 01D9 | RES2    | 01DB | RES3    | 01F5 | RESET   | 03EC | REST    | 01E1 | RH      | 0004 | RLL     | 0005 | RMCNT   | 02E  |
| RTO    | 0364 | RTDAC   | 02CE | RTNZ    | 0324 | RUN     | 0020 | SA0     | 0003 | SA1     | 0007 | SE      | 0010 | SEEK    | 0100 |
| SEEK0  | 0104 | SEEK1   | 0113 | SEEK1B  | 0281 | SEEK2   | 0132 | SEEK3   | 014D | SEEK4B  | 0262 | SEEK5   | 019E | SEEK6   | 01A1 |
| SEEKC  | 010F | SEEKNC  | 01A3 | SELHD   | 0239 | SELHDA  | 023D | SETCOM  | 023D | SETCYL  | 0234 | SETHD   | 0244 | SETLC   | 0222 |
| SETLC1 | 0226 | SETUC   | 022C | SETUC1  | 0230 | SK1N    | 0124 | SK1P    | 011E | SK41    | 0269 | SK42    | 026D | SK43    | 0271 |
| SKFLG  | 000D | SKINP   | 0035 | SP      | 0008 | SSPEND  | 01BD | STPEND  | 0080 | STSEEK  | 0286 | TM      | 0002 | TMD     | 002F |
| TRK    | 0007 | TRK1    | 000B | TRK3    | 005F | TRK4    | 0066 | TRK41   | 006F | TRK5    | 0087 | TRK50   | 00AB | TRK50A  | 00BA |
| TRK51  | 00C5 | TRK52   | 00D2 | TRK5A   | 00A8 | TRK6    | 00D5 | TRK61   | 00D6 | TRK7    | 00DE | TRKEN   | 007F | TRKFL3  | 01AA |
| UPRCYL | 003F | VCM     | 00FB | VELG    | 000E | WDAC    | 00F2 | WDACO   | 00EF | WNB1    | 001B | WNB2    | 0035 | W0BFE   | 01C8 |
| WP     | 0001 | WRADC   | 00BF | WRVCM   | 00F3 | Z0      | 0051 | Z01     | 0055 | Z0123   | 0049 | Z1      | 005B | Z2      | 004D |

Z23  004B   Z3  0051

ASSEMBLY COMPLETE, NO ERRORS

The embodiments of the invention in which an exclusive property or privilege is claimed are defined as follows.

1. A method for positioning and maintaining a disc head over a desired track centerline on a disc, said disc having a plurality of tracks and embedded servo information associated with each of said tracks, including track identification, said disc rotatably carried on a disc drive having means for moving said disc head, said method comprising the steps of:
   waiting for a portion of said embedded servo information to pass under said disc head;
   reading said portion of said embedded servo information;
   determining the current position of said disc head with an uncertainty of no greater than one-half track width;
   calculating the minimum possible distance between said current disc head position and said desired track centerline;
   calculating a driving signal to be applied to said disc head moving means, said driving signal being generally proportional to said minimum possible distance;
   reducing said driving signal to a maximum value if said driving signal exceeds said maximum value;
   changing said driving signal to a negative value if said current disc head position is on one side of said desired track centerline;
   applying said driving signal to said disc head moving means to cause said disc head to move at a velocity generally proportional to said driving signal; and
   returning to said waiting step.

2. A method as defined in claim 1 wherein said determining step comprises determining said current disc head position with an uncertainty of no greater than one-quarter track width when said disc head is within one-quarter track width of any track centerline.

3. A method as defined in claim 2 wherein said determining step comprises determining said current disc head position with substantially no uncertainty when said disc head is within one-quarter track width of said desired track centerline.

4. A method as defined in claim 1 wherein said determining step comprises determining said current disc head position with substantially no uncertainty when said disc head is within one-quarter track width of said desired track centerline.

5. A method for positioning and maintaining a disc head over a desired track centerline on a disc having a plurality of tracks and embedded servo information associated with each of said tracks including track identification, said disc being rotatably carried on a disc drive having means for moving said disc head, said method comprising the steps of:
   reading a portion of said embedded servo information;
   determining the current position of said disc head with an uncertainty of no greater than one-half track width;
   calculating the minimum possible distance between said current disc head position and said desired track centerline;
   calculating a driving signal generally proportional to said minimum possible distance;
   applying said driving signal to said disc head moving means; and
   returning to said reading step.

6. A method as defined in claim 5 wherein said determining step comprises determining said current disc head position with an uncertainty of no greater than one-quarter track width when said disc head is within one-quarter track width of any track centerline.

7. A method as defined in claim 6 wherein said determining step comprises determining said current disc head position with substantially no uncertainty when said disc head is within one-quarter track width of said desired track centerline.

8. A method as defined in claim 5 wherein said determining step comprises determining said current disc head position with substantially no uncertainty when said disc head is within one-quarter track width of said desired track centerline.

9. A method as defined in claim 5 further comprising, after said driving signal calculating step, the step of:
   reducing said driving signal to a maximum value if said driving signal exceeds said maximum value.

10. A method as defined in claim 9 further comprising, after said driving signal calculating step, the step of:
    changing said driving signal to a negative value if said current disc head position is on one side of said desired track centerline.

11. A method for positioning and maintaining a disc head over a desired track centerline on a disc rotatably carried on a disc drive having means for moving said disc head, said method comprising the steps of:
    determining the current position of said disc head with an uncertainty of no greater than one-half track width;
    calculating the minimum possible distance between said current disc position and said desired track centerline;
    calculating a driving signal to be applied to said disc head moving means, said driving signal being generally proportional to said minimum possible distance;
    reducing said driving signal to a maximum value if said driving signal exceeds said maximum value;
    applying said driving signal to said disc head moving means; and
    returning to said determining step.

12. A method as defined in claim 11 wherein said determining step comprises determining said current disc head position with an uncertainty of no greater than one-quarter track width when said disc head is within one-quarter track width of any track centerline.

13. A method as defined in claim 12 wherein said determining step comprises determining said current disc head position with substantially no uncertainty when said disc head is within one-quarter track width of said desired track centerline.

14. A method as defined in claim 11 wherein said determining step comprises determing said current disc head position with substantially no uncertainty when said disc head is within one-quarter track width of said desired track centerline.

15. A method as defined in claim 11 further comprising, after said driving signal calculating step, the step of:
    changing said driving signal to a negative value if said current disc head position is on one side of said desired track centerline.

16. A method as defined in claim 15 further comprising, after said driving signal calculating step, the step of:
    reducing said driving signal to a maximum value if said driving signal exceeds said maximum value.

17. A method for positioning and maintaining a disc head over a desired track centerline on a disc rotatably carried on a disc drive having means for moving said disc head, said method comprising the steps of:
   determining the current position of said disc head with an uncertainty of no greater than one-half track width;
   calculating the minimum possible distance between said current disc head position and said desired track centerline;
   calculating a driving signal to be applied to said disc head moving means, said driving signal being generally proportional to said distance;
   applying said driving signal to said disc head moving means; and
   returning to said determining step.

18. A method as defined in claim 17 wherein said determining step comprises determining said current disc head position with an uncertainty of no greater than one-quarter track width when said disc head is within one-quarter track width of any track centerline.

19. A method as defined in claim 18 wherein said determining step comprises determining said current disc head position with substantially no uncertainty when said disc head is within one-quarter track width of said desired track centerline.

20. A method as defined in claim 17 wherein said determining step comprises determining said current disc head position with substantially no uncertainty when said disc head is within one-quarter track width of said desired track centerline.

* * * * *

UNITED STATES PATENT AND TRADEMARK OFFICE
CERTIFICATE OF CORRECTION

PATENT NO. : 4,462,053
DATED : July 24, 1984
INVENTOR(S) : Francis Lum, et al

It is certified that error appears in the above-identified patent and that said Letters Patent is hereby corrected as shown below:

Column 8, lines 2 and 3:
 "Appendeix" should be --Appendix--

Column 60, Claim 11, line 34:
 After "disc" insert --head--

Column 60, Claim 15, line 57:
 "determing" should be --determining--

Signed and Sealed this

Twenty-sixth Day of February 1985

[SEAL]

Attest:

DONALD J. QUIGG

Attesting Officer        Acting Commissioner of Patents and Trademarks